(12) United States Patent
Bansal et al.

(10) Patent No.: US 7,917,911 B2
(45) Date of Patent: Mar. 29, 2011

(54) AUTOMATED GROUPING OF MESSAGES PROVIDED TO AN APPLICATION USING EXECUTION PATH SIMILARITY ANALYSIS

(75) Inventors: Jyoti Kumar Bansal, San Francisco, CA (US); David Isaiah Seidman, San Francisco, CA (US); Mark J. Addleman, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 906 days.

(21) Appl. No.: 11/565,723

(22) Filed: Dec. 1, 2006

(65) Prior Publication Data
US 2008/0134205 A1 Jun. 5, 2008

(51) Int. Cl.
*G06F 15/163* (2006.01)
(52) U.S. Cl. .......................................... 719/313; 706/12
(58) Field of Classification Search ................... 719/313
See application file for complete search history.

(56) References Cited

U.S. PATENT DOCUMENTS

| | | |
|---|---|---|
| 4,774,681 A | 9/1988 | Frisch |
| 5,375,199 A | 12/1994 | Harrow |
| 5,426,730 A | 6/1995 | Miyake |
| 5,655,081 A | 8/1997 | Bonnell |
| 5,784,553 A | 7/1998 | Kolawa |
| 5,790,858 A | 8/1998 | Vogel |
| 5,862,381 A | 1/1999 | Advani |
| 5,898,873 A | 4/1999 | Lehr |
| 5,940,618 A | 8/1999 | Blandy |
| 5,978,594 A | 11/1999 | Bonnell |
| 5,996,092 A | 11/1999 | Augsburg |

(Continued)

FOREIGN PATENT DOCUMENTS

EP 1024430 2/2000

OTHER PUBLICATIONS

Andrew Foss; W. Wang; O. Zaïane. A Non-Parametric Approach to Web Log Analysis. Presented at Workshop on Web Mining Midland Hotel, Chicago, Illinois (Apr. 7, 2001). [Retrieved from http://citeseerx.ist.psu.edu/viewdoc/summary?doi=10.1.1.1.6609 on Nov. 12, 2009].*

Natheer Khasawneh. Toward Better Website Usage: Leveraging Data Mining Techniques and Rough Set Learning to Construct Better-To-Use Websites. Dissertation, University of Akron (Aug. 2005).

(Continued)

*Primary Examiner* — Hyung S Sough
*Assistant Examiner* — Brian Wathen
(74) *Attorney, Agent, or Firm* — Vierra Magen Marcus & DeNiro LLP

(57) ABSTRACT

An application is monitored to identify different execution paths, e.g., sequences of invoked components, which occur due to the receipt of messages by the application. Similarities between the execution paths are determined based on a distance algorithm, in one approach, and execution paths which are similar are assigned to a common group. Additionally, application runtime data such as response times is obtained for the execution paths and aggregated for the group. The messages can also be grouped based on the grouping of the execution paths. Further, a representative execution path can be determined for each execution path group for comparison to subsequent execution paths. A representative message can similarly be determined for each message group. Results can be reported which include a group identifier, representative message, representative execution path, count, and aggregated runtime data.

37 Claims, 15 Drawing Sheets

U.S. PATENT DOCUMENTS

| | | | |
|---|---|---|---|
| 6,141,699 | A | 10/2000 | Luzzi |
| 6,260,187 | B1 | 7/2001 | Cirne |
| 6,263,298 | B1 | 7/2001 | Kerman |
| 6,266,805 | B1 | 7/2001 | Nwana |
| 6,282,701 | B1 | 8/2001 | Wygodny |
| 6,295,642 | B1 | 9/2001 | Blandy |
| 6,332,212 | B1 | 12/2001 | Organ |
| 6,332,213 | B1 | 12/2001 | Grossman |
| 6,530,075 | B1 | 3/2003 | Beadle |
| 6,611,276 | B1 | 8/2003 | Muratori |
| 6,643,842 | B2 | 11/2003 | Angel |
| 6,654,741 | B1 | 11/2003 | Cohen |
| 6,658,367 | B2 | 12/2003 | Conrad |
| 6,792,460 | B2 | 9/2004 | Oulu |
| 6,941,367 | B2 | 9/2005 | Vosseler |
| 7,076,695 | B2 | 7/2006 | McGee |
| 7,093,013 | B1 | 8/2006 | Hornok, Jr. |
| 7,376,752 | B1* | 5/2008 | Chudnovsky et al. ........ 709/245 |
| 2002/0029265 | A1 | 3/2002 | Mizoguchi |
| 2002/0038228 | A1 | 3/2002 | Waldorf |
| 2002/0073195 | A1 | 6/2002 | Hellerstein |
| 2002/0099731 | A1* | 7/2002 | Abajian ........................ 707/500 |
| 2002/0169870 | A1 | 11/2002 | Vosseler |
| 2002/0174222 | A1 | 11/2002 | Cox |
| 2002/0198985 | A1 | 12/2002 | Fraenkel |
| 2003/0009507 | A1 | 1/2003 | Shum |
| 2003/0018909 | A1 | 1/2003 | Cuomo |
| 2003/0065986 | A1 | 4/2003 | Fraenkel |
| 2003/0079160 | A1* | 4/2003 | McGee et al. .................. 714/39 |
| 2003/0158895 | A1 | 8/2003 | Mehra |
| 2003/0191989 | A1 | 10/2003 | O'Sullivan |
| 2004/0003375 | A1 | 1/2004 | George |
| 2004/0042430 | A1 | 3/2004 | Addy |
| 2004/0068560 | A1 | 4/2004 | Oulu |
| 2004/0075690 | A1 | 4/2004 | Cirne |
| 2004/0078691 | A1* | 4/2004 | Cirne et al. ..................... 714/38 |
| 2004/0123279 | A1 | 6/2004 | Boykin |
| 2004/0215762 | A1 | 10/2004 | Oulu |
| 2004/0215768 | A1 | 10/2004 | Oulu |
| 2004/0254920 | A1 | 12/2004 | Brill |
| 2005/0021748 | A1 | 1/2005 | Garcea |
| 2005/0039187 | A1 | 2/2005 | Avakian |
| 2005/0049924 | A1 | 3/2005 | DeBettencourt |
| 2005/0055437 | A1 | 3/2005 | Burckart |
| 2005/0060372 | A1 | 3/2005 | DeBettencourt |
| 2005/0114508 | A1 | 5/2005 | DeStefano |
| 2005/0149360 | A1* | 7/2005 | Galperin ........................... 705/2 |
| 2005/0228890 | A1 | 10/2005 | Lawrence |
| 2005/0229165 | A1 | 10/2005 | Ma |
| 2006/0095569 | A1 | 5/2006 | O'Sullivan |
| 2006/0095570 | A1 | 5/2006 | O'Sullivan |
| 2006/0104518 | A1 | 5/2006 | Yang |
| 2006/0218143 | A1 | 9/2006 | Najork |
| 2007/0005782 | A1 | 1/2007 | Zheng |
| 2007/0266149 | A1 | 11/2007 | Cobb |
| 2008/0034082 | A1* | 2/2008 | McKinney ................... 709/224 |
| 2008/0104062 | A1 | 5/2008 | Oliver |
| 2008/0134209 | A1 | 6/2008 | Bansal et al. |

OTHER PUBLICATIONS

[Retrieved from http://etd.ohiolink.edu/send-pdf.cgi/Khasawneh%20Natheer%20Yousef.pdf?acc__num=akron1120534472 on Nov. 12, 2009].*

T.A. Runkler; J.C. Bezdek. Web Mining With Relational Clustering. International Journal of Approximate Reasoning. vol. 32 (2003). pp. 217-236.*

Fred J. Damerau. A Technique for Computer Detection and Correction of Spelling Errors. Communicaitons of the ACM. vol. 7, No. 3 (Mar. 1964). pp. 171-176.*

S. Guha, R. Rastogi, and K. Shim, "ROCK: A Robust Clustering Algorithm for Categorical Attributes," Proceedings of the 15th International Conference in on Data Engineering, pp. 512-521 (Mar. 23-26, 1999) [retrieved from http://linkinghub.elsevier.com/retrieve/pii/S0306437900000223 on May 17, 2010].*

D. Reilly and M Reilly, Java Network Programming and Distributed Computing, Person Education Inc., Boston, MA, pp. 237-314 (2000).*

I. Witten and E. Frank, Data Mining: Practical Machine Learning Tools and Techniques with Java Implementations, Morgan Kaufmann Publishers, San Francisco, CA, pp. 210-227, 325-328 (2000).*

Maneesh Sahu, Java Server Pages From Scratch (2001), Que Publishing, pp. 1-40, 181-261.*

Michael Sipser, Introduction to the Theory of Computation (1997), PWS Publishing Co., pp. 3-4.*

Response to Office Action dated Dec. 11, 2008, U.S. Appl. No. 11/565,730, filed Dec. 1, 2006.

Office Action dated May 13, 2009, U.S. Appl. No. 11/565,730, filed Dec. 1, 2006.

Office Action dated Sep. 16, 2008, U.S. Appl. No. 11/565,730, filed Dec. 1, 2006.

U.S. Appl. No. 09/795,901, filed Feb. 28, 2001, "Adding Functionality To Existing Code At Exits," by Cobb.

U.S. Appl. No. 11/304,153, filed Dec. 15, 2005, "Execution Flow Shape Compression for Aggregate Data Reporting in an Application Manager," by Vanrenen et al.

"Using the WorkArea Facility," Version 4.0, WebSphere Application Server, IBM Corp., Mar. 2001.

Sodhi,et al. "Skeleton Based Performance Prediction on Shared Networks," CCGRID 2004: The IEEE International Symposium on Cluster Computing and the Grid, Apr. 2004, Chicago, IL.

"JSR 149: Work Area Service for J2EE," Sun Microsystems, www.jcp.org/en/jsr/detail?id=149&showPrint, printed Aug. 22, 2005.

Notice of Allowance dated Nov. 2, 2009, U.S. Appl. No. 11/565,730, filed Dec. 1, 2006.

* cited by examiner

Fig. 7

Message strings

M1: tx=buy_book|item=sub_mystery_ttl456|int_grp=mystery|gender=male

M2: tx=buy_book|item=sub_romance_ttl650|int_grp=romance|gender=female

M3: tx=buy_book|item=sub_sports_ttl023|int_grp=sports|gender=male

M4: tx=buy_accessory|item=sub_writing_id75000|int_grp=childrens|gender=male

M5: tx=buy_book|item=sub_history_ttl110|int_grp=sports|gender=female

M6: tx=buy_book|item=sub_sports_ttl435|int_grp=sports|gender=female

M7: tx=buy_book|item=sub_history_ttl560|int_grp=history|gender=female

M8: tx=buy_accessory|item=sub_writing_id66005|int_grp=sports|gender=male

M9: tx=buy_book|item=sub_childrens_ttl999|int_grp=childrens|gender=female

M10: tx=buy_accessory|item=sub_clothes_id85000|int_grp=sports|gender=male

M11: tx=buy_book|item=sub_sports_ttl756|int_grp=sports|gender=male

M12: tx=buy_book|item=sub_sports_ttl879|int_grp=sports|gender=male

Fig. 8

Inter-message string distances

|     | M1 | M2 | M3 | M4 | M5 | M6 | M7 | M8 | M9 | M10 | M11 | M12 |
|-----|----|----|----|----|----|----|----|----|----|-----|-----|-----|
| M1  | x  | 18 | 15 | 29 | 14 | 16 | 10 | 27 | 21 | 27  | 13  | 15  |
| M2  | x  | x  | 19 | 30 | 16 | 17 | 16 | 28 | 19 | 30  | 18  | 19  |
| M3  | x  | x  | x  | 28 | 10 | 5  | 15 | 21 | 19 | 19  | 3   | 3   |
| M4  | x  | x  | x  | x  | 29 | 31 | 28 | 10 | 24 | 14  | 28  | 29  |
| M5  | x  | x  | x  | x  | x  | 8  | 7  | 22 | 17 | 22  | 10  | 10  |
| M6  | x  | x  | x  | x  | x  | x  | 13 | 23 | 17 | 22  | 5   | 5   |
| M7  | x  | x  | x  | x  | x  | x  | x  | 27 | 17 | 26  | 14  | 15  |
| M8  | x  | x  | x  | x  | x  | x  | x  | x  | 31 | 9   | 22  | 22  |
| M9  | x  | x  | x  | x  | x  | x  | x  | x  | x  | 30  | 19  | 18  |
| M10 | x  | x  | x  | x  | x  | x  | x  | x  | x  | x   | 20  | 20  |
| M11 | x  | x  | x  | x  | x  | x  | x  | x  | x  | x   | x   | 3   |

Fig. 9

| Message String | Message group | Application runtime data |
|---|---|---|
| M1 | 4 | ARD1 |
| M2 | 4 | ARD2 |
| M3 | 1 | ARD3 |
| M4 | 3 | ARD4 |
| M5 | 2 | ARD5 |
| M6 | 1 | ARD6 |
| M7 | 2 | ARD7 |
| M8 | 3 | ARD8 |
| M9 | 1 | ARD9 |
| M10 | 3 | ARD10 |
| M11 | 1 | ARD11 |
| M12 | 1 | ARD12 |

Fig. 10

| Message group | Representative message string | Count | Aggregated runtime data |
|---|---|---|---|
| 1 | M3 | 5 | ARD-AGG1 |
| 2 | M5 | 2 | ARD-AGG2 |
| 3 | M4 | 3 | ARD-AGG3 |
| 4 | M1 | 2 | ARD-AGG4 |

Fig. 14
Execution paths

EP1: C1-C1A-C1A1-C2-C3-C3A-C4-C5-C5A-C5A1-C6

EP2: C1-C1A-C1A1-C2-C3-C3A-C4-C5-C5A-C5A2-C6

EP3: C1-C1A-C1A1-C2-C3-C3A-C4-C5-C5B-C5B1-C6

EP4: C1-C1A-C1A1-C2-C3-C3B-C4-C5-C5A-C5A1-C6

EP5: C1-C1A-C1A1-C2-C3-C3B-C4-C5-C5A-C5A2-C6

EP6: C1-C1A-C1A1-C2-C3-C3B-C4-C5-C5B-C5B1-C6

EP7: C1-C1A-C1A2-C2-C3-C3A-C4-C5-C5A-C5A1-C6

EP8: C1-C1A-C1A2-C2-C3-C3A-C4-C5-C5A-C5A2-C6

EP9: C1-C1A-C1A2-C2-C3-C3A-C4-C5-C5B-C5B1-C6

EP10: C1-C1A-C1A2-C2-C3-C3B-C4-C5-C5A-C5A1-C6

EP11: C1-C1A-C1A2-C2-C3-C3B-C4-C5-C5A-C5A2-C6

EP12: C1-C1A-C1A2-C2-C3-C3B-C4-C5-C5B-C5B1-C6

Fig. 15
Inter-execution path distances

|      | EP1 | EP2 | EP3 | EP4 | EP5 | EP6 | EP7 | EP8 | EP9 | EP10 | EP11 | EP12 |
|------|-----|-----|-----|-----|-----|-----|-----|-----|-----|------|------|------|
| EP1  | x   | 1   | 2   | 1   | 2   | 3   | 1   | 2   | 3   | 2    | 3    | 4    |
| EP2  | x   | x   | 2   | 2   | 1   | 3   | 2   | 1   | 3   | 3    | 2    | 4    |
| EP3  | x   | x   | x   | 3   | 3   | 1   | 3   | 3   | 1   | 4    | 4    | 2    |
| EP4  | x   | x   | x   | x   | 1   | 2   | 2   | 3   | 4   | 1    | 2    | 3    |
| EP5  | x   | x   | x   | x   | x   | 2   | 3   | 2   | 4   | 2    | 1    | 3    |
| EP6  | x   | x   | x   | x   | x   | x   | 4   | 4   | 2   | 3    | 3    | 1    |
| EP7  | x   | x   | x   | x   | x   | x   | x   | 1   | 2   | 1    | 2    | 3    |
| EP8  | x   | x   | x   | x   | x   | x   | x   | x   | 2   | 2    | 1    | 3    |
| EP9  | x   | x   | x   | x   | x   | x   | x   | x   | x   | 3    | 3    | 1    |
| EP10 | x   | x   | x   | x   | x   | x   | x   | x   | x   | x    | 1    | 2    |
| EP11 | x   | x   | x   | x   | x   | x   | x   | x   | x   | x    | x    | 2    |

Fig. 16a

| Message | Execution path | Execution path/ message group | Application runtime data |
|---|---|---|---|
| M1 | EP5 | 3 | ARD1 |
| M2 | EP3 | 2 | ARD2 |
| M3 | EP4 | 1 | ARD3 |
| M4 | EP12 | 2 | ARD4 |
| M5 | EP8 | 3 | ARD5 |
| M6 | EP6 | 2 | ARD6 |
| M7 | EP11 | 3 | ARD7 |
| M8 | EP1 | 1 | ARD8 |
| M9 | EP1 | 1 | ARD9 |
| M10 | EP9 | 2 | ARD10 |
| M11 | EP2 | 1 | ARD11 |
| M12 | EP7 | 1 | ARD12 |
| M13 | EP10 | 3 | ARD13 |
| M14 | EP6 | 2 | ARD14 |
| M15 | EP7 | 1 | ARD15 |
| M16 | EP12 | 2 | ARD16 |
| M17 | EP2 | 1 | ARD17 |
| M18 | EP9 | 2 | ARD18 |
| M19 | EP11 | 3 | ARD19 |
| M20 | EP3 | 2 | ARD20 |

Fig. 16b

| Execution path group/message group | Representative execution path | Representative message string | Count | Aggregated application runtime data |
|---|---|---|---|---|
| 1 | EP1 | M3 | 7 | ARD-AGG1 |
| 2 | EP3 | M2 | 8 | ARD-AGG2 |
| 3 | EP5 | M1 | 5 | ARD-AGG3 |

AUTOMATED GROUPING OF MESSAGES PROVIDED TO AN APPLICATION USING EXECUTION PATH SIMILARITY ANALYSIS

CROSS-REFERENCE TO RELATED APPLICATIONS

This application is related to co-pending, commonly assigned U.S. patent application Ser. No. 11/565,730, filed herewith on Dec. 1, 2006 (published as U.S. 2008/0134209 on Jun. 5, 2008, and issued as U.S. Pat. No. 7,689,610 on Mar. 30, 2010), titled "Automated Grouping Of Messages Provided To An Application Using String Similarity Analysis", incorporated herein by reference.

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

For example, application runtime data can be obtained which identifies individual software components that are invoked in the application. This approach can use agents that essentially live in the system being monitored. For example, an execution path, e.g., thread or process, can be traced to identify each component that is invoked as well as obtain runtime data such as the execution time of each component. Tracing refers to obtaining a detailed record, or trace, of the steps a computer program executes. One type of trace is a stack trace. Traces can be used as an aid in debugging.

Another approach involves monitoring traffic which is sent between a client and an application, for instance, such as requests and corresponding responses. This approach can be used to obtain information such as response times which characterizes a client's interaction with the application.

However, techniques are needed for facilitating the understanding of correlations between the traffic which is provided to an application, and the application runtime data which is generated by the application in response to the traffic.

SUMMARY OF THE INVENTION

The present invention addresses the above and other issues by providing a system and method for automatically characterizing messages which are sent to an application, characterizing execution paths in the application, and associating application runtime data with the messages.

In one embodiment, a computer-implemented method for characterizing execution paths includes identifying execution paths of an application, where the execution paths are responsive to receipt by the application of messages. For example, each execution path can identify components which are invoked during execution of the application. The method further includes, responsive to the identifying, calculating metrics which represent distances between the execution paths, and grouping the execution paths according to the metrics into different groups of execution paths. The method further includes, responsive to the grouping of the execution paths, grouping the messages into different groups of messages.

The metrics represent a distance, e.g., a similarity, between execution paths and can be calculated by considering an order in which the components are invoked, by considering a predetermined subset of the invoked components, or by according different weights to different components. The metrics can also be calculated according to whether a predetermined portion of components in different execution paths are the same. The metrics can also be calculated so that execution paths whose distance from one another is less than a threshold are grouped together, or so that each of the groups of execution paths has a similar number of execution paths. Further, grouping into a hierarchy of groups can be performed.

The method may further include providing a report which is responsive to the grouping of the messages. For example, the report may be provided as a list or graphical display on a user interface which indicates which messages were classified into which group.

One or more of the execution paths can involve multiple applications, in which case an identifier which represents invoked components in at least a first application of the multiple applications is used in the calculating of the metrics. Also, when each execution path identifies components which are invoked during execution of multiple applications, the multiple applications can include at least a first application which executes in response to the receipt of the message, and a second application which is called by the first application.

In another embodiment, a computer-implemented method for characterizing execution paths includes identifying an execution path of an application, where the execution path is responsive to receipt by the application of a message. The method further includes, responsive to the identifying, calculating metrics which represent distances between the identified execution path and representative execution paths of each of a number of groups of execution paths, and grouping the identified execution path into one of the groups of execution paths for which the metric indicates a minimum distance. The method further includes, responsive to the grouping, grouping the message into one of a number of groups of messages. The metrics can be calculated based on various factors as mentioned previously.

In one approach, the identified execution path identifies components which are invoked during execution of the application.

The representative execution paths can be set based on a learning period in which execution paths of the application are identified.

In other embodiments, at least one processor readable storage device having processor readable code embodied thereon may be provided for programming at least one processor to perform the above-mentioned methods.

BRIEF DESCRIPTION OF THE DRAWINGS

FIG. 7 depicts example message strings derived from messages which are provided to an application.

FIG. 8 depicts inter-message string distances between the message strings of FIG. 7.

FIG. 9 depicts group assignments for the message strings of FIG. 7, based on the inter-message distances of FIG. 8, along with application runtime data associated with each message string.

FIG. 10 depicts representative message strings for each group of FIG. 9, along with aggregated application runtime data associated with each group.

FIG. 14 depicts example execution paths of an application.

FIG. 15 depicts inter-execution path distances between the execution paths of FIG. 14.

FIG. 16*a* depicts group assignments for the execution paths of FIG. 14, based on the inter-execution path distances of FIG. 15, along with application runtime data associated with each execution path and message.

FIG. 16*b* depicts representative execution paths and message strings for each group of FIG. 16*a*, along with aggregated application runtime data associated with each group.

DETAILED DESCRIPTION

Figure 1:
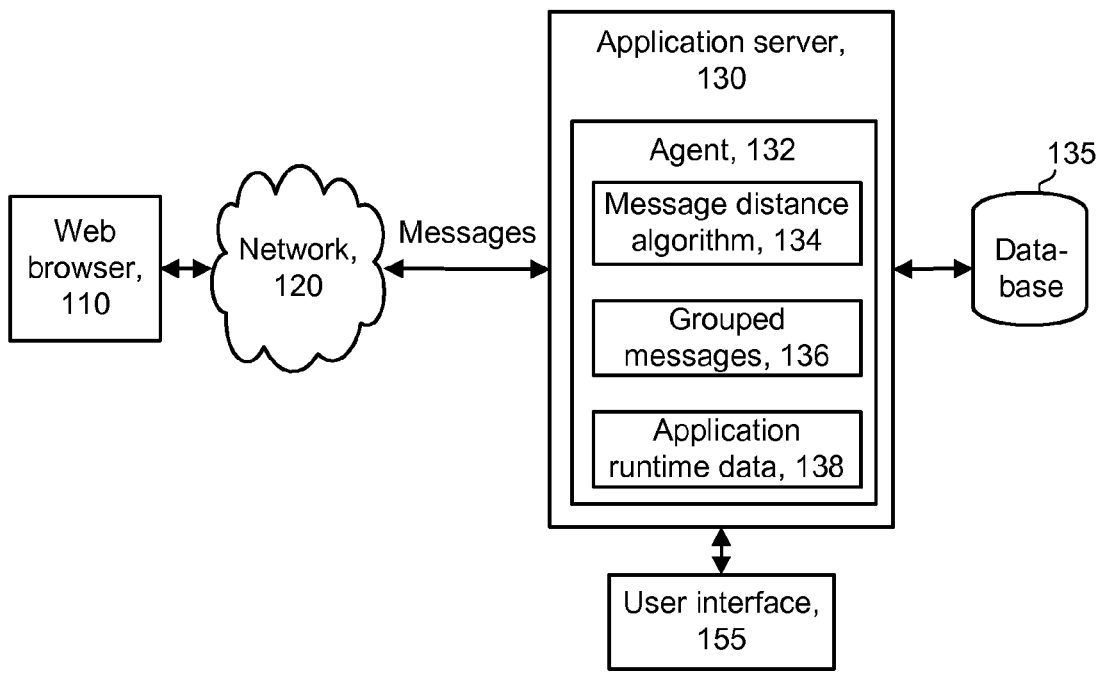
FIG. 1 depicts a system in which messages provided to an application are grouped.

The present invention provides a system and method for automatically characterizing messages which are sent to an application, characterizing execution paths in the application, and associating application runtime data of the execution paths with the messages.

For component-based applications, such as those based on JAVA 2 PLATFORM ENTERPRISE EDITION (J2EE™) (a type of platform for server programming), one approach to managing an application is to collect data about individual software components that are invoked in the application. Software components are typically invoked by processes or threads executing in an application, middleware or other software. For example, for a web-based e-commerce application, a process at an application server is typically initiated by a request to the server, such as a user request to purchase an item. The process may invoke a number of components to carry out the steps necessary to allow the user to purchase the item. For example, a shopping cart component may be used to allow the user to identify the item desired, the payment method and the shipping information. A reservation component may be used to reserve the item while a credit check component verifies the user's credit card information. Once the credit card information is verified, an inventory component is updated based on the item purchased, and a shipping component is invoked to arrange for the item to be shipped, such as by contacting a warehouse. An order completion component may be invoked to confirm the purchase to the user such as by providing an order confirmation number and a tracking number on a web page. Moreover, a given component may be invoked more than once.

An execution path of the application can be traced to identify each component that is invoked as well as obtain performance data such as the execution time of each component. An execution path refers generally to the sequence of components which are invoked when a computer program executes. Tracing can be used to obtain a detailed record, or trace, of the invoked components. One type of trace is a stack trace. For example, an execution path can be initiated in response to a request to an application, and can include processing involving one or more processes, and/or one or more threads. An execution path can include a sequence of resources which are consumed. Generally, an execution path can involve one or more methods, processes, procedures, functions, threads or sets of instructions or the like for performing a task. In the JAVA™ environment, for instance, an execution path can include a method invocation in a running software system that enters and exits a JAVA VIRTUAL MACHINE (JVM™)(a type of virtual machine), and everything the JVMT™ calls. Further, an execution path can involve one or more applications and one or more servers on which the applications run.

Information from execution paths can be aggregated into a data set that is small enough to be reported. For example, assume there are one thousand requests to an application server. For each execution path, application runtime data such as the response time can be determined. Aggregated application runtime data such as the slowest, fastest, median and mean response times can then be determined for the execution paths. Application runtime data can include detailed information regarding the execution of an application, such as information regarding application components which are invoked and timing information regarding how requests were processed and responses were generated. Application runtime data can include average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions.

However, it has been problematic to associated requests or other messages which are provided to an application with the application runtime data. In one approach, incoming messages can be compared to patterns to determine when there is a match. However, this is an expensive manual step which requires an operator who understands the behavior of an application to specify the patterns. For example, for most applications, a logical business transaction, such as buying a book from a web site, can involve an arbitrarily large number of unique Uniform Resource Locators (URLs), a type of Uniform Resource Identifier (URI), in incoming messages. In order to understand the aggregate performance of an application, it is helpful to find meaningful aggregation groups broken out by conceptual business function. In one approach, the operator manually specifies HyperText Transfer Protocol (HTTP) request patterns (e.g., URL and HTTP request parameters) to produce these URL groups. However, incoming messages to different applications will include different sets of URLs, so the ability to reuse these patterns is minimal. Attempts to configure a web application monitoring solution therefore require an expensive manual step.

In one aspect, techniques are provided herein for automatically grouping incoming messages without operator intervention, based on the insight that a given business transaction, such as buying a book from a web site, will execute in similar ways inside an application, regardless of some differences in the incoming messages. Further, application runtime data can be aggregated over the different message groups to provide a correlation between the message groups and the aggregated application runtime data. For instance, for a bookseller's web site, a message group may identify a certain type of books which are purchased, and the aggregated application runtime data may identify a response time. With this information, an analysis can be made of book type vs. response time to reveal any anomalies. For instance, it may be revealed that response time is unusually high for purchases of books related to nutrition. An appropriate analysis can therefore be undertaken to remedy the problem.

In another example, a message group may identify a certain type of payment which is made, e.g., involving a certain type of credit card, and the aggregated application runtime data may identify how often a payment is not successfully processed, e.g., due to a payment process timing out. With this information, an analysis can be made of credit card type vs. payment success. Many other implementations are possible. Further, the techniques are not limited to messages based on HTTP but can include other types of messages, including those based on JAVA™ Message Service (JMS) (a type of service for sending messages), Structured Query Language (SQL), Simple Object Access Protocol (SOAP), Remote Method Invocation (RMI) or XML web services protocols.

FIG. 1 depicts a system in which messages provided to an application are grouped. Typically, one or more applications can be provided for interacting with one or more clients. An example client is a web browser 110 of a user which exchanges messages with an application at an application server 130 via a network 120 such as the Internet. The web browser 110 typically accesses the network 120 via an Internet Service Provider, not shown. The application executes in response to messages received from the web browser. For example, a message from the web browser 110 may be a request for information, such as a web page, in which case the application responds by performing a process for retrieving the requested information. If the information can be located, it is provided to the web browser in a message sent from the application server 130 to the web browser. Or, the message from the web browser 110 may be a request to store data, such as an HTTP post message, in which case the application responds by performing a process for storing the data. In this case, the application may not send a message back to the web browser. A client can also be an automated process such as a program running on a server.

Agent software, denoted by agent 132, may run on the application server 130 to gather information from an application, middleware or other software running on the application server 130, in one possible approach. For example, such information, referred to as application runtime data, may be obtained using instrumentation such as byte code instrumentation. However, the gathered data may be obtained in other ways as well. The agent 132 can process data locally as well as communicate with a central manager, if desired. See also FIG. 3, which depicts agents of multiple application servers communicating with a central manager.

Various approaches are known for instrumenting software to monitor its execution. For example, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or bytecode of an application to be monitored is instrumented, e.g., modified, with probes. The probes measure application runtime data as specific pieces of information about the application without changing the application's business or other logic. The agent software receives application runtime data from the probes and may communicate the application runtime data to another process, such as at a central manager, or process the application runtime data locally, such as to determine whether an abnormal condition is present. The application runtime data may indicate start and stop times of a transaction or other execution path, or of individual components within a transaction/execution path. This information can be compared to pre-established criteria to determine if it within bounds. If the information is not within bounds, the agent can report this fact so that appropriate troubleshooting can be performed.

An application can be monitored by instrumenting bytecode or intermediate language (IL) code of the application, by plugging into an exit built into the application or network server, or by any other monitoring technique.

The application server 130 can communicate with a user interface 155, such as a monitor, to display information based on application runtime data received from the agent 132. The application server 130 can also access a database 135 to store the application runtime data received from the agent 132. The agent 132 also includes a message distance algorithm module 134 for determining distances between messages which are received by the application from one or more clients. The message distance algorithm identifies messages which are similar based on a similarity criterion. One approach uses the Levenshtein algorithm. However, various other known distance algorithms can be used. The messages may be stored in a log and parsed to obtain strings, such as text strings of alpha and/or numeric characters, which are compared to one another using the message distance algorithm. A grouped messages module 136 classifies or groups the messages based on results from the message distance algorithm module 134. A representative message for each group can also be identified. Further, an application runtime data module 138 stores aggregated application runtime data for each message group. Further details regarding the modules of the agent 132 are discussed below. Note that the functionality of the modules 134, 136 and 138 can be performed at a different location than the application server 130, if desired, and need not be part of the agent 132. For example, the functionality may be performed for a number of application servers at a central manager.

Figure 2:
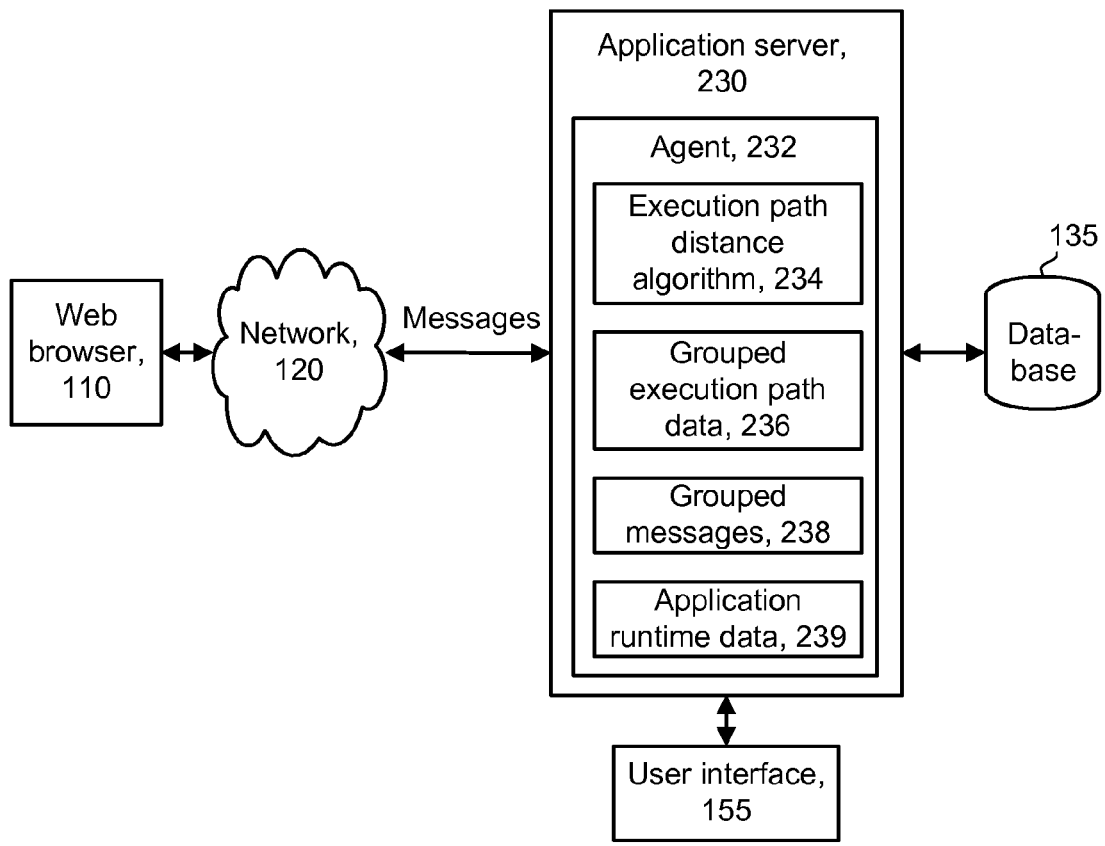
FIG. 2 depicts a system in which execution paths of an application are grouped, and messages provided to the application are grouped based on the grouping of the execution paths.

FIG. 2 depicts a system in which execution paths of an application are grouped, and messages provided to the application are grouped based on the grouping of the execution paths. The computer system depicted is analogous to that of FIG. 1, but the agent 232 at the application server 230 includes an execution path distance algorithm module 234 for determining distances between execution paths of the application. The execution path distance algorithm identifies execution paths which are similar based on a similarity criterion. One approach uses the Levenshtein algorithm. However, various other known distance algorithms can be used. Sequences of invoked components in different execution paths may be identified and compared to one another using the execution path distance algorithm. A grouped execution path data module 236 classifies or groups the execution paths based on results from the execution path distance algorithm module 234. A representative execution path for each group can also be identified. A grouped messages module 238 classifies or groups the messages based on results from the execution path distance algorithm module 234. Further, an application runtime data module 239 can store aggregated application runtime data for each execution path group and/or message group. Further details regarding the modules of the agent 232 are discussed below. Note that the functionality of the modules 234, 236, 238 and 239 can be performed at a different location than the application server 230, if desired, and need not be part of the agent. For example, the functionality may be performed for a number of application servers at a central manager. Moreover, the application server 230 may communicate with the user interface 155 and the database 135 as discussed in connection with FIG. 1.

Figure 3:
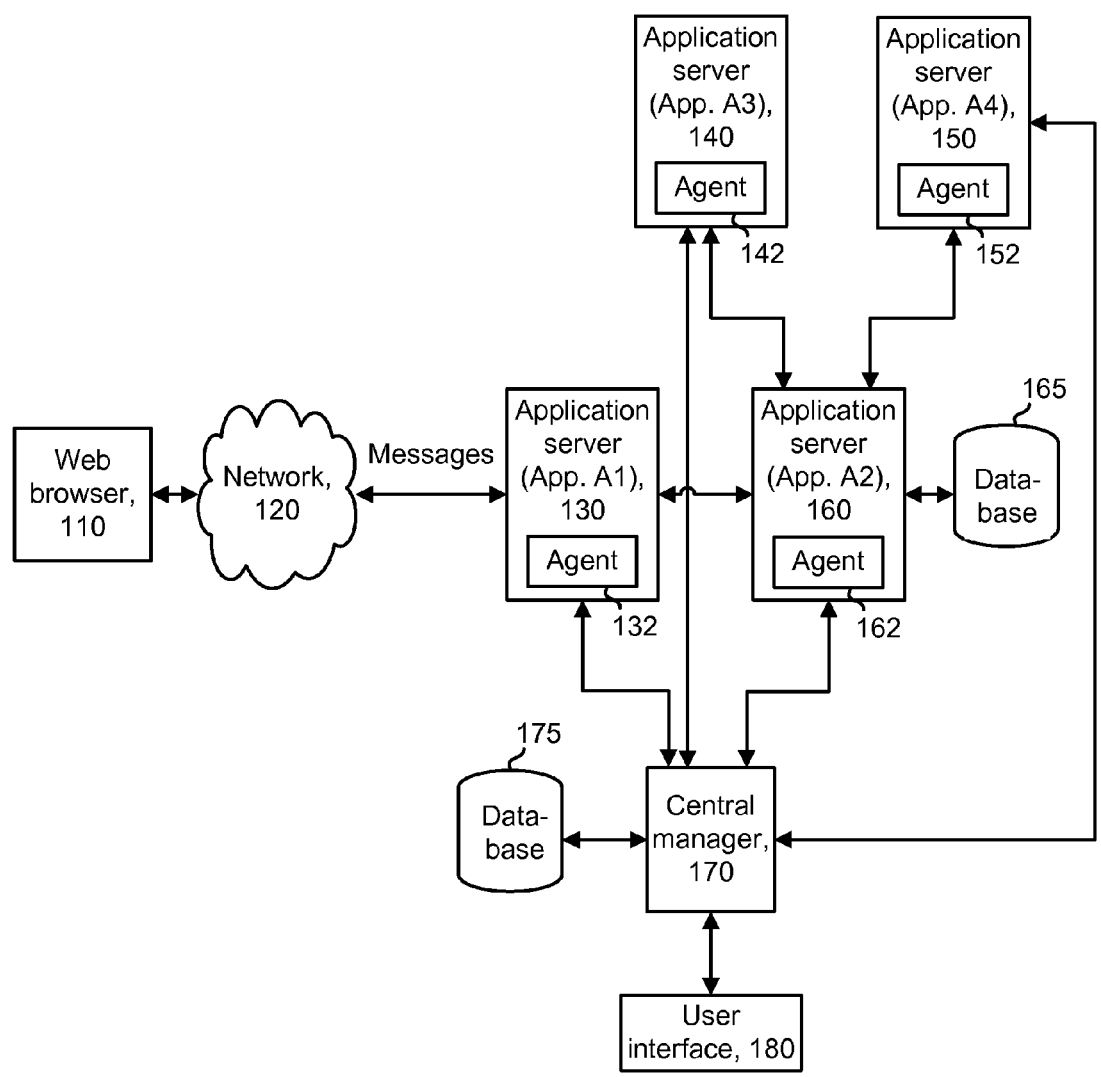
FIG. 3 depicts a system in which an execution path extends across multiple application servers, and the multiple application servers communicate with a central manager.

FIG. 3 depicts a system in which an execution path extends across multiple application servers, and the multiple application servers communicate with a central manager. Here, the web browser 110 communicates via the network 120 with the application server 130 of FIG. 1. An application (App. A1) which runs on the application server 130 communicates with an application (App. A2) running at an application server 160. App. A2, in turn, communicates with an application (App. A3) running at an application server 140 and with an application (App. A4) running at an application server 150. The additional application servers 140, 150 and 160 have associated agents 142, 152 and 162, respectively, for obtaining information regarding execution paths and application runtime data of the respective applications. Application server 160 also includes an associated database 165 with which it communicates. For example, in responding to a message from the web browser 110, App. A1 may call App. A2 to obtain additional information, and App. A2 may call App. A3 and App. A to obtain the requested information. In this case, the execution path spans multiple applications.

In one approach, each agent is unaware of the execution path of other applications with which it is not associated, e.g., agent 130 is not aware of the portion of the execution path at App. A2, App. A3 and App. A4. Each agent is aware of its local execution path information, and the application which it calls, and can provide a report accordingly to a central manager 170. The central manager 170 can assemble an execution path fragment from each agent to obtain a continuous, overall execution path. The agents can also report their application runtime data to the central manager 170. The central manager 170 includes a database 175 for storing execution path data, message data, application runtime data, and other data. A user interface 180 may be provided for accessing the data maintained by the central manager 170.

Figure 4:
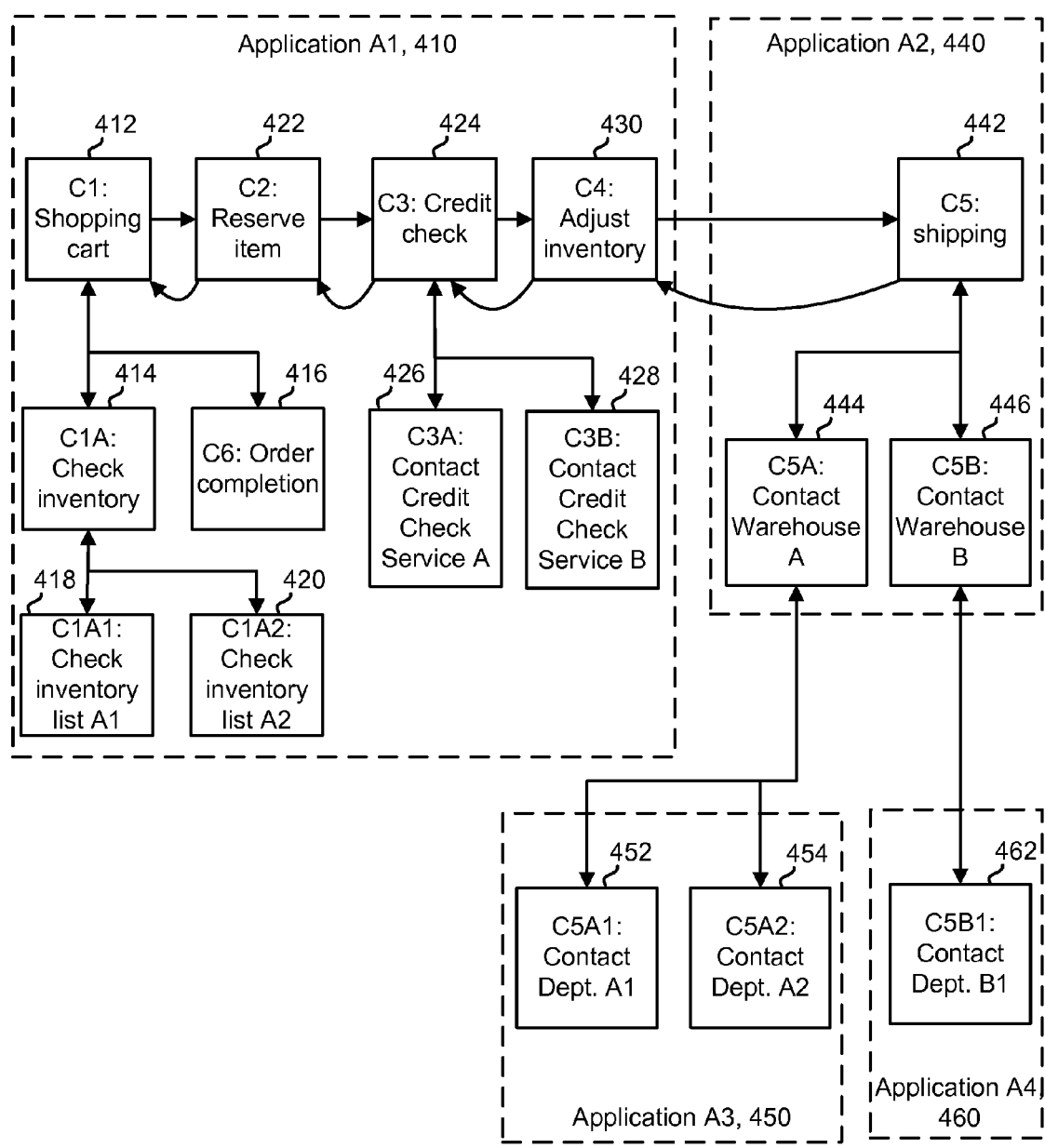
FIG. 4 depicts an example sequence of components which can be invoked in different execution paths of an application.

FIG. 4 depicts an example sequence of components which can be invoked in different execution paths of an application. Components are depicted in an application A1 410, application A2 440, application A3 450 and application A4 460, which may run on the different application servers 130, 160, 140 and 150, respectively, of FIG. 3. The sequence of components provided herein is an example of one possible type of execution path. Each component which is invoked can be considered part of an execution path. Note that, when an application is instrumented, typically only selected components are instrumented based on the developer's understanding of the application and selection of components which are expected to be of interest. Thus, many components which are not deemed to be of interest may be invoked in an application, but are not included in execution paths. Additionally, various compression techniques can be used, as discussed further below, to provide a simplified representation of an execution path.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE™ (a type of platform for server programming), which can employ components such as a JAVA SERVER PAGE™ (a type of web page), an ENTERPRISE JAVA BEAN™ (a type of software component), a servlet, and a JAVA DATABASE CONNECTIVITY™ component (a type of software component in a database). However, other component oriented programming models may also be used, such as those using MICROSOFT®.NET components. Moreover, the programming model need not be object oriented.

The specific example shown refers to a web-based e-commerce application which allows users to order items. The components correspond to business logic or e-commerce steps in the application. Together, the components comprise an execution path. In particular, a component C1 412 provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. C1 412 calls a component C1A 414 to check an inventory to determine if the selected item is in stock. C1A 414, in turn, can call one or both of a component C1A1 418, which checks inventory from a list A1, and a component C1A2 420, which checks inventory from a list A2. Once it is determined that the selected item is in stock, C1 412 calls a component C2 422, which reserves the item. This is done so that the item will not be sold to another user while the transaction is still pending. Once finished, C2 422 calls a component C3 424, which checks the user's credit card information to authorize and validate the purchase. This typically involves communicating with one or more external servers that are managed by one or more credit card clearinghouses. For example, C3 424 can call one or both of a component C3A 426, which contacts a credit check service A, and a component C3B 428, which contacts a credit check service B.

Once C3 424 successfully finishes, thereby approving the purchase, it calls a component C4 430 which adjusts an inventory by decrementing the quantity of the item purchased. C4 430 calls a component C5 442 which is part of application A2 440. C5 442 arranges for the item to be shipped, such as by contacting a warehouse, where a shipping label is printed and an operator is prompted to manually locate and pack the item. For example, C5 442 can call one or both of a component C5A 444, which contacts a warehouse A, and a component C5B 446, which contacts a warehouse B. C5A 444 can call one or both of components C5A1 452 and C5A2 454 in application A3 450. C5B 446 can call a component C5B1 462 in application A4 460.

Once the components C2-C5 have executed, program control returns to C1 412, which calls an order completion component C6 416 to confirm the purchase to the user such as by providing an order confirmation number and a tracking number, e.g., in a confirmation e-mail or web page. In one possible implementation, C1 and C6 are JAVA SERVER PAGES™ and C2-C5 are ENTERPRISE JAVABEANS™.

Note that a first component can continue executing after calling another component, which begins executing, in an asynchronous, multi-thread or multi-process mode, or can temporarily pause until the called component has finished executing, in a synchronous, single-thread or single-process mode. For example, C1 412 can pause while the components C2-C5 execute. Moreover, a given component may be invoked more than once during a transaction. For example, assume the user has purchased multiple items that are stored at different warehouses. In this case, C5 442 may execute repeatedly, contacting a different warehouse and/or warehouse department for each item.

Figure 5:
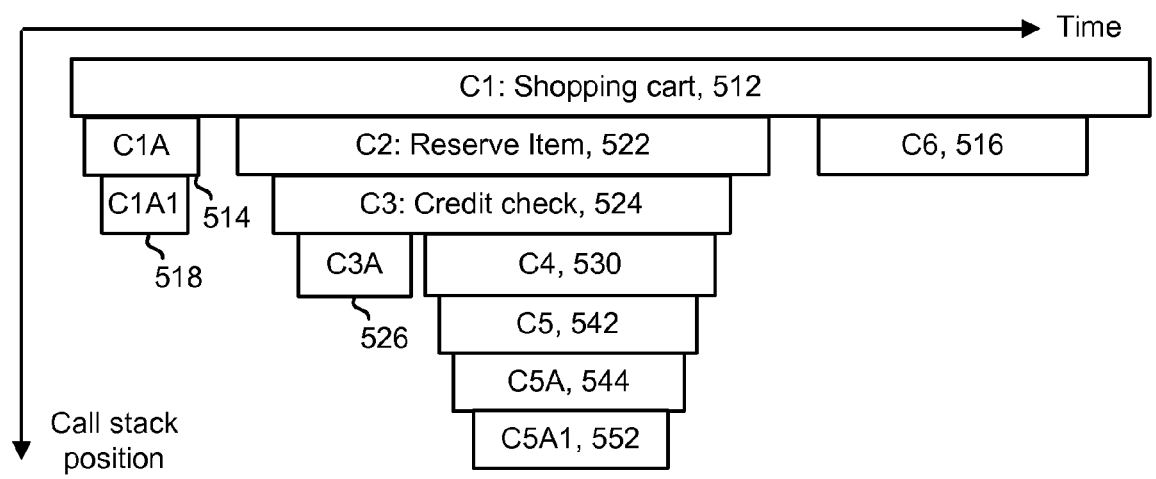
FIG. 5 depicts an example call stack depth versus time representation of a sequence of components invoked in an execution path.

FIG. 5 depicts an example call stack depth versus time representation of a sequence of components invoked in an execution path. The components correspond to one possible execution path in the sequence of FIG. 5. The representation is an example of the type of execution path information obtained by one or more agents. The execution path information can identify which components of an application are invoked and the time in which they are invoked. The horizontal direction represents time, while the vertical direction indicates call stack depth or position. A call stack identifies components which have been called or invoked during the execution of one or more programs or threads. In the graphical representation, which can be provided on a user interface display, for instance, C1 512 is the first or root component of the call stack. C1A 514, C2 522 and C6 516 are at a second layer of the call stack, C1A1 518 and C3 524 are at a third layer of the call stack, C3A 526 and C4 530 are at a fourth layer of the call stack, C5 542 is at a fifth layer of the call stack, C5A 544 is at a sixth layer of the call stack and C5A1 552 is at a seventh layer of the call stack. After C1 begins to execute, at the start of a transaction, C1A is called, then C1A1 is called. After C1A and C1A1 successively finish executing, C1 calls C2. After C2 begins to execute, C3 is called. After C3 begins to execute, C3A and C4 are called. After C4 begins to execute, C5 is called. After C5 begins to execute, C5A is called. After C5A begins to execute, C5A1 is called. After C5A1, C5A, C5, C4, C3, and C2 successively finish executing, C1 calls C6. After C6 finishes executing, C1, and the transaction, finish executing.

Figure 6:
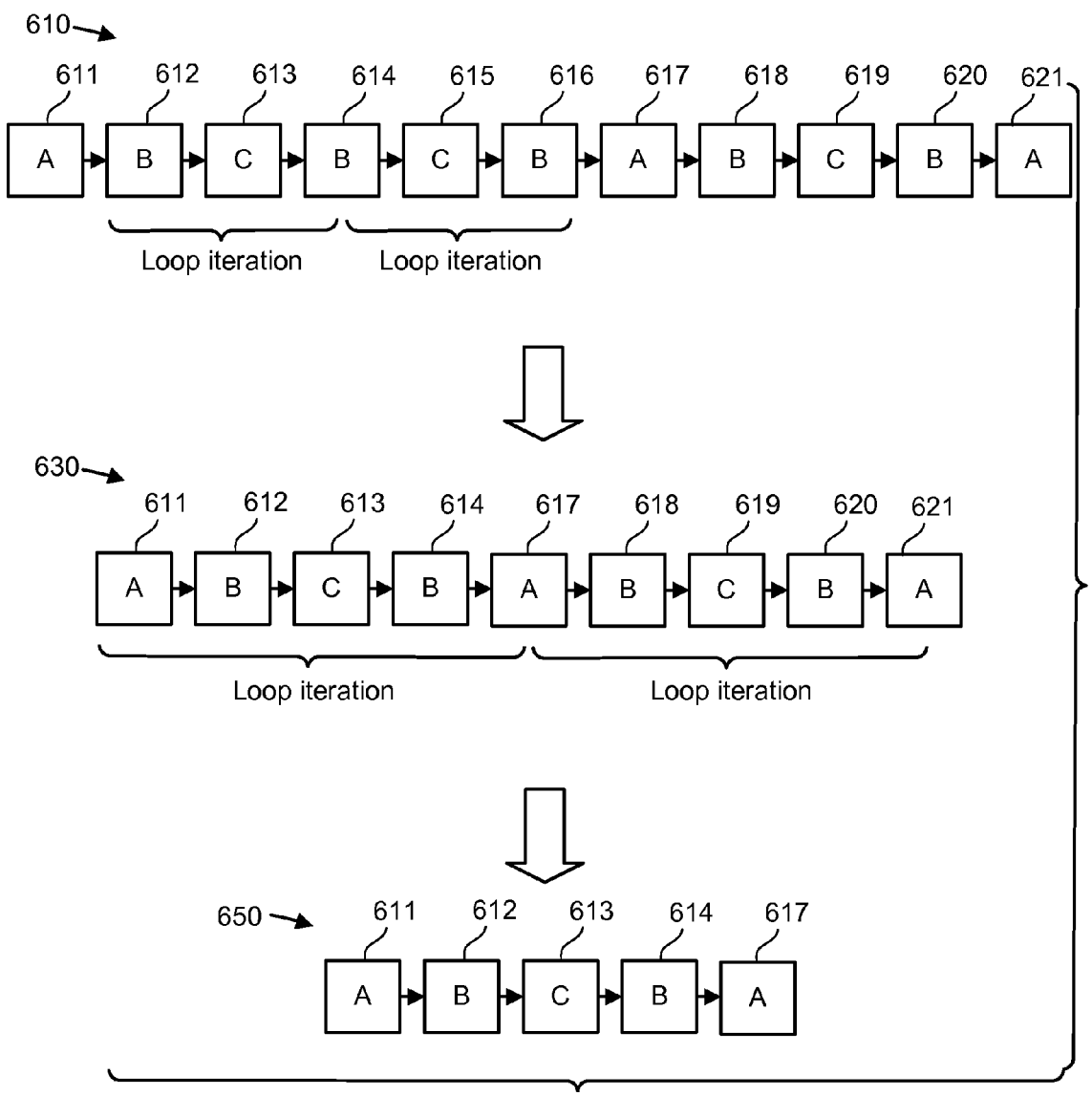
FIG. 6 depicts compression of an execution path having multiple loops.

FIG. 6 depicts compression of an execution path having multiple loops. Compression can be used to reduce the amount of information in an execution path, while avoiding the loss of data about important components. Furthermore, the compression can be applied while an execution path is executing or after the execution path has finished executing. By minimizing the number of execution paths generated and aggregating execution path data on the agent, the memory required by the agent, and the bandwidth required to report the data collected, are minimized.

One compression rule which may be employed involves treating multiple iterations of a loop as a single iteration. The component sequence 610 indicates an example execution path involving a number of components 611-621 which are invoked, e.g., in a sequence formed by component A 611, component B 612, component C 613, component B 614, component C 615, component B 616, component A 617, component B 618, component C 619, component B 620 and component A 621. Loop compression involves recognizing loops formed by repeated iterations of sequences of components. For instance, in the sequence 610, the sequence of B-C-B appears twice. The first iteration involves components 612-614, while the second iteration involves components 614-616. The multiple iterations are collapsed by replacing them with a single iteration, as indicated by the sequence 630, in which the single iteration is provided by components 612-614.

Additionally, in the sequence 630, the sequence of component A-B-C-B-A appears twice. The first iteration involves components 611-617, while the second iteration involves components 617-621. The multiple iterations are collapsed by replacing them with a single iteration, as indicated by the sequence 650 which is a compressed or simplified execution path. Other forms of compression can include component skipping, in which certain components are deemed to be relatively unimportant and are not included in an execution path. Further, recursive calls by components can be ignored. Further information regarding compression can be found in co-pending U.S. patent application Ser. No. 11/304,153, filed Dec. 15, 2005, titled "Execution Flow Shape Compression For Aggregate Data Reporting In An Application Manager," incorporated herein by reference.

FIG. 7 depicts example message strings derived from messages which are provided to an application. Various types of messages can be provided to an application, including messages relating to HyperText Transfer Protocol (HTTP), JAVA Message Service (JMS), Structured Query Language (SQL), Simple Object Access Protocol (SOAP), Remote Method Invocation (RMI) or XML web services protocols. HTTP is the underlying protocol used by the World Wide Web. The JMS API is a messaging standard that allows application components based on the JAVA™ 2 PLATFORM, ENTERPRISE EDITION (J2EE™) to create, send, receive, and read messages. SQL is a standardized query language for requesting information from a database. RMI provides a set of protocols that enables JAVA™ objects to communicate remotely with other JAVA™ objects. SOAP is a lightweight XML based messaging protocol.

An HTTP message is considered for illustrative purposes. An HTTP message generally can include Uniform Resource Locator (URL) components, header parameters and post parameters. The following is an example HTTP message:
POST /dir/file.html?P1=V1&P2=V2 HTTP/1.1
Host: www.ebooks.com
Cookie: P3=V3; P4=V4
Content-Type: application/www-form-urlencoded
P5=V5&P6=V6

The URL components are:
URL Host=www.ebooks.com
URL Path=/dir/file.html

The HTTP header parameters are:
Query P1=V1
Query P2=V2
Cookie P3=V3
Cookie P4=V4

The HTTP post parameters are:
POST P5=V5
POST P6=V6

An HTTP message which is received by an application can be parsed to obtain a string, such as a text string of alpha and/or numeric characters. For example, the agent or other process can perform this task. In one possible approach, a string is obtained from a concatenation of the message components. For example, the above-mentioned HTTP message can be expressed as follows:
URL Host=www.ebooks.com|URL Path=/dir/file.html|Query P1=V1|Query P2=V2|Cookie P3=V3|Cookie P4=V4|POST P5=V5|POST P6=V6,
or, in a simplified manner, as:
www.ebooks.com|/dir/file.html|P1=V1|P2=V2|P3=V3|P4=V4|P5=V5|P6=V6.

A specific example is geared toward an e-commerce web site for buying books. The header parameters include two queries and two cookie parameters. No post parameters are used in the present example. The twelve message strings depicted in FIG. 7 are illustrative. The URL (www.ebooks.coml/dir/file.html), not shown individually for each message, is included at the beginning of each message, but makes no difference in the distance calculations discussed below.

Referring to the first message (M1), the query "tx=buy_book" denotes a transaction (tx) of buying a book from the web site. The query "item=sub_mystery_ttl456" denotes the purchased item has an identifier of "sub_mystery_ttl456". That is, the subject (sub) of the book relates to the mystery genre. "ttl456" is an identifier of the particular book within a set of mystery books. Again, the present example is merely an illustration of one possible scenario, as various other message formats can be used. Note that the present example employs both abbreviations for English words as well as number strings. The term "text" is meant to include both alphabetic symbols and numbers. The queries can include alphabetic symbols and/or numbers which encode different meanings. The cookie "int_grp=mystery" indicates that the particular user who is buying the book has been previously identified as being in an interest group (int_grp) for the mystery genre. For example, this determination may be based on prior purchases or online browsing of the user, or a self-selection by the user. The cookie "gender=male" indicates the user is a male. The cookie information may be used with the purchase information in the queries to gain a better understanding of the users who interact with the web site. In another example, cookies identify users who are frequent customers who are eligible for discounts or special offers. Note that session and user identifiers may also be obtained from the messages.

Referring to the fourth message (M4), the query "tx=buy_accessory" denotes a transaction (tx) of buying an accessory from the web site. The query "item=sub_writing_id75000" denotes the purchased item has an identifier of "sub_writing_id75000". That is, the subject (sub) of the accessory relates to writing implements. "id75000" is an identifier of the particular writing implement. The cookie "int_grp=childrens" denotes the user's interest group is children's products, and the cookie "gender=male" denotes the user is a male. The remaining messages can be understood by analogy to the above explanations.

FIG. 8 depicts inter-message string distances between the message strings of FIG. 7. In the present example, the Levenshtein distance algorithm is used to obtain a metric which denotes a distance, e.g., similarity, between two strings. As an example, the distance between M3 and M11 is three because these message strings are identical except for the title value, e.g., ttl023 for M3 and ttl756 for M11. In particular, the Levenshtein distance or edit distance between two strings is given by the minimum number of operations needed to transform one string into the other, where an operation is an insertion, deletion, or substitution of a single character. The Levenshtein distance algorithm can be considered a generalization of the Hamming distance, which is used for strings of the same length and only considers substitution edits. Variations of the Levenshtein distance algorithm include the Damerau-Levenshtein distance algorithm, which considers, for example, transposing two characters as an operation. However, any technique which provides a measure of similarity between strings can be used.

In one approach, the distance algorithm which is used can be applied without being configured by an operator. In another approach, an operator can configure the distance algorithm, e.g., via an appropriate user interface and software tool. For example, the operator can configure which portions of a message are used for the distance algorithm, e.g., cookie parameters may be included but not post parameters, the type of distance algorithm used, the messages for which the distance algorithm is used, a time in which the distance algorithm is used, and so forth. In another example, the operator may configure the distance algorithm so that a specified portion of a message is used in the distance algorithm, e.g., only the first one hundred characters. Different weights can also be assigned to different portions of a message. For example, a distance between URL components may be assigned a greater weight in a distance calculation than a distance between HTTP header parameters. Or, within the HTTP header parameters, a query may be assigned a greater weight than a cookie. Various other options are possible. The settings can also be preset in the distance algorithm without operator intervention.

It is also possible to compare a string which is obtained from multiple messages. For example, a client interaction with an application can involve a sequence of messages, in which case each message can be parsed to obtain information which is used in an aggregate string. The target string can then be compared to other aggregate strings from other sequences of messages to determine whether they are similar.

FIG. 9 depicts group assignments for the message strings of FIG. 7, based on the inter-message distances of FIG. 8, along with application runtime data associated with each message string. The messages strings can be grouped in different ways. In one approach, message strings are grouped when their distance is less than a threshold, e.g., one unit. The threshold can be predetermined, or it can be set based on the distances which are calculated, e.g., as a fraction of the range of distances. In another approach, message strings are grouped so that each group has a similar number of message strings. That is, the grouping process can attempt to provide the same number of message strings in each group, or the same number within some margin such as +/−10%. In this case, the average distances might vary among the groups. Further, once a message group is defined, it may be maintained constant. Or, a message group can be modified over time based on new messages, such as by modifying a representative message string, and/or new message groups may be formed over time. These options can all be configured by the operator or preset.

In the present example, message strings which have the shortest inter-message distance are grouped together. Once a message string is assigned to a group, it is not available for grouping with other message strings. In one possible implementation, M3, M6, M9, M11 and M12 are assigned to a first group, M5 and M7 are assigned to a second group, M4, M8 and M10 are assigned to a third group, and M1 and M2 are assigned to a fourth group. Thus, the message groups have different numbers of message strings. Additionally, application runtime data (ARD) which is associated with each message string is depicted. Specifically, ARD1 through ARD12 is associated with M1 through M12, respectively.

In another possible option, the message strings are grouped according to the distance metrics into a hierarchy of groups. For example, a first set of the distance metrics can be calculated which represent distances between URLs of the strings. Then, additional distance metrics are calculated for each message which represent distances between, e.g., HTTP header parameters and/or HTTP post parameters. The message strings can then be grouped into a first level of a hierarchy of groups based on the first set of distance metrics, and into a second level of the hierarchy of groups based on the additional distance metrics.

FIG. 10 depicts representative message strings for each group of FIG. 9, along with aggregated application runtime data associated with each group. Once the groups are defined, a representative message string from each group can be selected to represent the group for calculating distance metrics relative to new message strings. For example, the representative message string can be one of the message strings in the group, such as the first message string in the group, or a randomly chosen message string in the group. In another approach, the representative message string may be one of the messages in the group for which a sum of the inter-message distances relative to other messages in the group is a minimum. For ties, one of the tied message strings can be chosen randomly. Or, the representative message string may be synthesized to correspond to an average of the message strings in the group. In the present example, M3, M5, M4 and M1 are selected as the representative message strings for groups 1, 2, 3 and 4, respectively.

Additionally, aggregated application runtime data (ARD-AGG) is depicted for each message group. In one approach, the aggregated application runtime data represents an aggregation of application runtime data obtained when the application executes in response to the receipt of messages in the group. For example, application runtime data can represent a response time, e.g., a time consumed by the application in responding to a request. For instance, in FIG. 9, in group 3, ARD4, ARD8 and ARD10 for M4, M8 and M10, respectively, may be 100 msec., 150 msec. and 200 msec. Aggregated application runtime data (ARD-AGG3) for the group can include a slowest (longest) response time of 200 msec. Accordingly, once the messages are assigned to groups, the application runtime data which is associated with each message can be aggregated over the group. A count of the number of message strings which have been assigned to each group is also provided.

Note also that the operator can review and edit the group assignments, as well as the representative string.

The agent or other process associated with the application, and/or a central manager, if used, can maintain the information identified in FIGS. 7-10.

Figure 11:
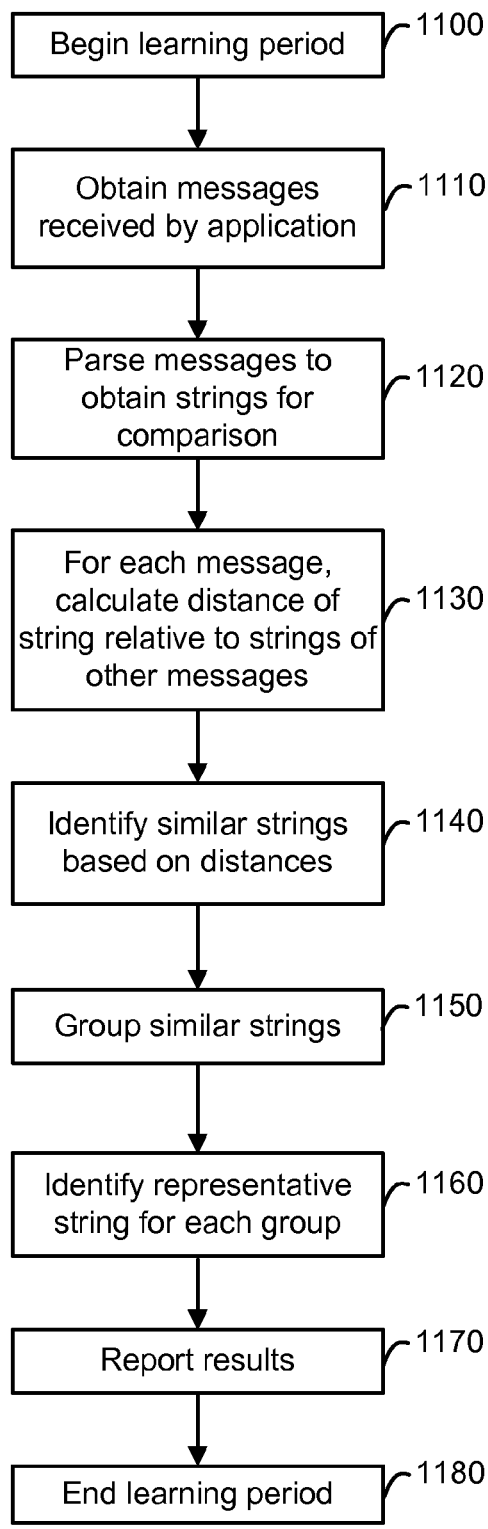
FIG. 11 depicts a learning process for defining message groups.

FIG. 11 depicts a learning process for defining message groups. In one approach, assignment of messages, e.g., message strings, to groups occurs in a learning period in which a number of messages are stored and subsequently processed to determine their inter-message distances. This may be considered an initialization process. Once the groups are defined, subsequently received messages can be assigned to the existing groups. In particular, at step 1100, a learning period begins. For instance, this can be a few hours. Note that the messages can be real, e.g., from users interacting with web browsers, and/or simulated, e.g., from a robot which generates messages based on a script. At step 1110, messages received by the application are obtained. For example, the agent associated with the application may store the messages in a local data store. At step 1120, the messages are parsed to obtain strings for comparison. At step 1130, for each message, a distance is calculated for the message's string relative to strings of other messages. At step 1140, similar strings are identified based on the distances. For example, strings whose distance from one another is less than a threshold may be considered to be similar. The threshold may be predetermined or set based on the distance calculations. Setting the threshold based on the distance calculations may take into account the distribution of distances, including the maximum and the minimum distance. At step 1150, similar strings are grouped. For example, flags or other identifiers may be set for the strings to indicate the group into which they are assigned. At step 1160, a representative string is identified for each group.

At step 1170, results are reported, e.g., by providing a data file and/or displaying a user interface. The results can include the information provided in FIG. 10, for example, including message group identifier, representative message string, count of strings assigned to each group, and aggregated application runtime data organized by message group. In one approach, results are stored in a log and the log is periodically reported. Agents for multiple applications may report results to the central manager. At step 1180, the learning period ends.

Figure 12:
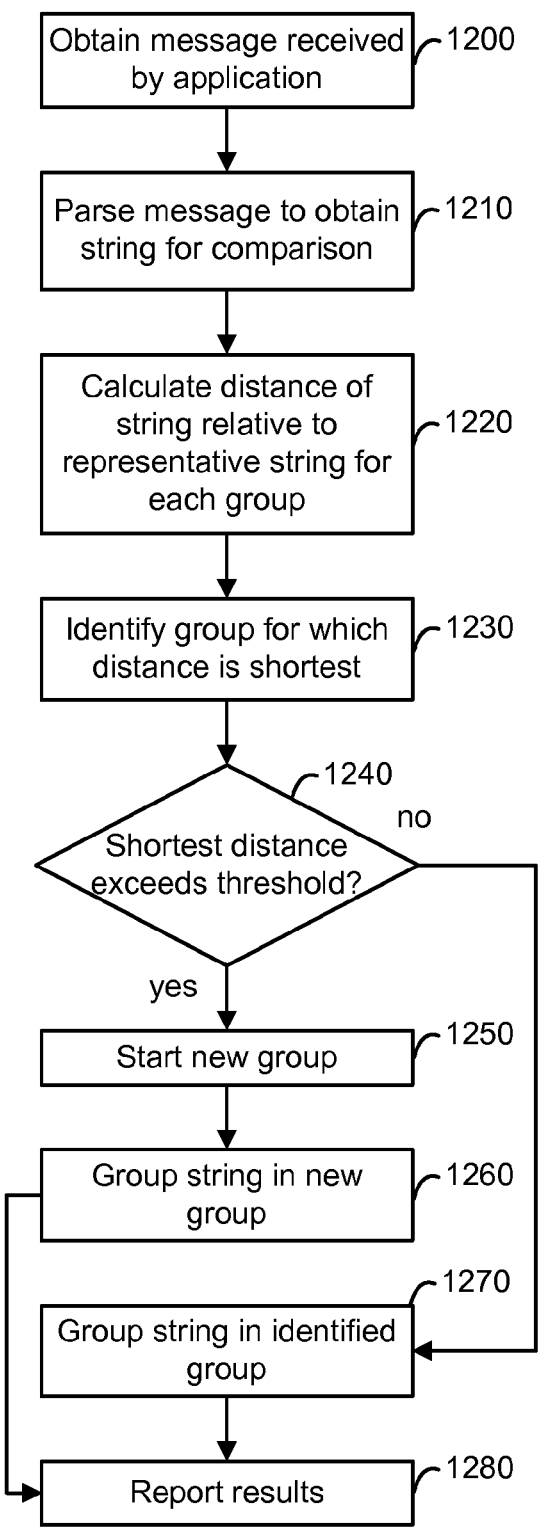
FIG. 12 depicts a process for grouping messages.

FIG. 12 depicts a process for grouping messages. The process can occur after the learning period depicted in FIG. 11, for example. At step 1200, a message received by an application is obtained. For example, the agent associated with the application may store the message in a local data store. At step 1210, the message is parsed to obtain a string for comparison. At step 1220, for a distance is calculated for the message's string relative to a representative string for each group. At step 1230, the group for which the distance is the shortest is identified. At decision step 1240, which is used in one possible approach, a determination is made as to whether the shortest (minimum) distance exceeds a threshold. The threshold can be preset or set based on the distance calculations. If the shortest distance exceeds the threshold, a new message group is started (step 1250) and the string is grouped into the new group, e.g., as the sole member of the group initially (step 1260). If the shortest distance does not exceed the threshold, the string is grouped into the identified group for which the distance is shortest (step 1270). At step 1280, results are reported. Results can be reported after one or more new messages are received, e.g., by providing a data file and/or displaying a user interface. The results can include the information provided in FIG. 10, for example. In one approach, results are stored in a log and the log is periodically reported.

Note that grouping a string which is derived from a message can be equivalent to grouping the message itself. Moreover, once the message groups are defined, it is not necessary to store each string which is grouped. Instead, a count can be maintained of the number of strings, e.g., messages, which have been grouped into each message group. A count can also be provided to identify the number of strings which were used to define a group and/or the number of strings which have been assigned to a previously defined group. Various other counts can be maintained as well. As a result, the amount of information which is reported can be reduced relative to a case where each message or message string is reported.

Further, the process outlined by FIG. 12 can be modified so that multiple messages are processed at a time rather than one message being processed at a time.

Figure 13:
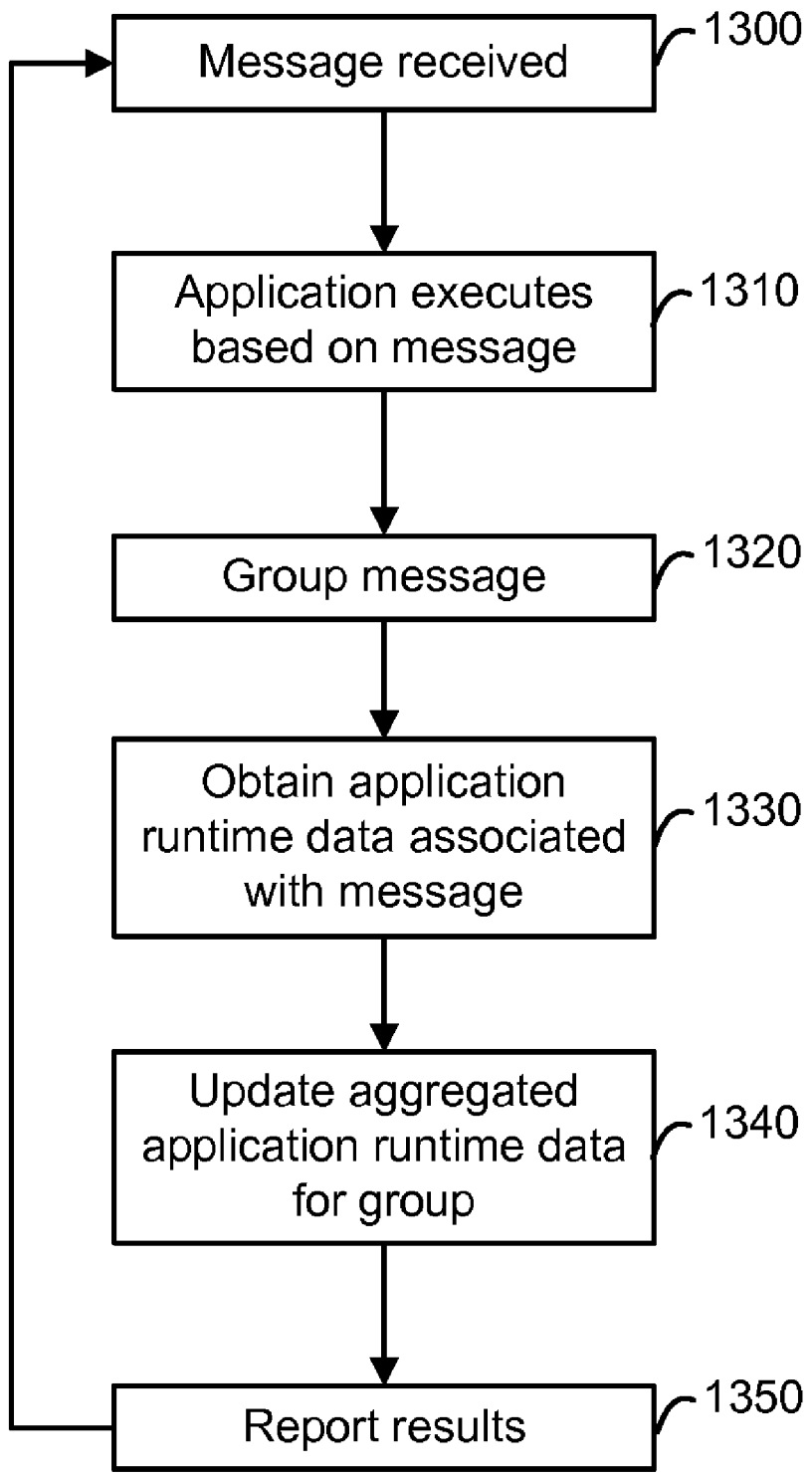
FIG. 13 depicts a process for grouping messages and obtaining aggregated application runtime data.

FIG. 13 depicts a process for grouping messages and obtaining aggregated application runtime data. At step 1300, a message is received by an application and, at step 1310, the application executes based on the message, such as to fulfill a request. At step 1320, the message is grouped, e.g., using the techniques discussed herein. For instance, this can include defining groups based on a number of messages obtained in a learning period, or assigning one or more messages to previously defined groups. At step 1330, application runtime data associated with the message is obtained. At step 1340, the aggregated application runtime data for a group can be updated. For example, the aggregated application runtime data for a group may indicate that a slowest response time for the group is 200 msec. If the response time of a new message assigned to the group is 250 msec., the aggregated application runtime data for the group can be updated to indicate that the slowest response time for the group is now 250 msec. At step 1350, results are reported as discussed.

FIG. 14 depicts example execution paths of an application. Execution paths can be processed in a manner which is analogous to the processing of message as described above. In one approach, the execution of an application is monitored, e.g., using instrumentation, to obtain execution path information, such as a sequence of components which are invoked as the application executes. Each component may be identified by a class or method/function with which the component is associated, or other identifier, for instance. In one approach, the execution paths are obtained by the agent and stored in a log.

The present example uses simplified identifiers for the components, e.g., consistent with FIG. 4. In particular, the execution paths represent possible sequences in which the components depicted in FIG. 4 can be invoked. Twelve execution paths are depicted by EP1 through EP12.

FIG. 15 depicts inter-execution path distances between the execution paths of FIG. 14. The path distances can be computed by analogy to FIG. 8. In the present example, the path distances span a small range because the component identifiers are shorter than those for the message strings. Again, the example is only one possible implementation as many other implementations are possible. A general principle which is illustrated is that similarities in messages and execution paths can be identified automatically, even without specific a priori knowledge of the messages and execution paths. As result, the similar message and execution paths can be quickly identified, and significant information can be gained regarding correlations between messages, execution paths and application runtime data.

As with the inter-message distance calculations, the Levenshtein distance or edit distance between two strings, or any technique which provides a measure of similarity between strings, can be used to calculate the inter-execution path distance.

In one approach, the distance algorithm which is used can be applied without being configured by an operator. In another approach, an operator can configure the distance algorithm, e.g., via an appropriate user interface and software tool, so that the correlations obtained are even more relevant.

For example, the operator can configure which portions of an execution path are used for the distance algorithm, the type of distance algorithm used, the execution paths for which the distance algorithm is used, a time in which the distance algorithm is used, and so forth. Different weights can also be assigned to different components in an execution path. For example, if an execution path extends over multiple applications, and a distance is obtained separately for the components of each application, it is possible to accord a higher weight to the distance metric of a specified application. Or, the first and last components, or the first n and last m components, for instance, can be weighted more heavily in determining similarity.

In a further approach, the distance algorithm considers an order in which the components are invoked in the execution paths so that two identical sequences of components that are invoked in the same order have a zero distance. Or, the distance algorithm need not consider an order in which the components are invoked so that two identical sequences of components that are invoked in different orders can have a zero distance.

The distance algorithm can also consider a predetermined subset of the invoked components, such as the first ten invoked components. The execution paths can also be grouped according to whether a predetermined portion of components in different execution paths are the same. For example, if one-half of the components are the same in two execution paths, the paths are grouped. The grouping may be based, e.g., on the first five of the ten components, the last five of the ten components, the first three and the last two components, and so forth. The execution paths can also be grouped so that execution paths whose distance from one another is less than a threshold are grouped together. The threshold may be predetermined, or may be determined dynamically based on the execution path data which is obtained, e.g., in a learning period. Further, the execution paths may be grouped so that each group of execution paths has a similar number of execution paths. That is, the grouping process can attempt to provide the same number of execution paths in each group, or the same number within some margin such as +/−10%. In this case, the average distances might vary among the groups.

In yet another option, the execution paths can be grouped according to the distance metrics into a hierarchy of groups. For instance, the first five components of an execution path may be used for grouping into a first level of a hierarchy, while the last five components are used for grouping into a second level of the hierarchy.

In another approach, the execution paths involve multiple applications, such as when a first application executes in response to receipt of a message, and a second application is called by the first application. The components invoked by a particular application can be represented in the aggregate by an identifier of the particular application in the distance calculations. This may be desirable when the fact that an application is invoked in more significant than the specific components invoked. For example, components C5, C5A and C5B of application A2 (FIG. 4) can be represented by an identifier A2. Similarly, components C5A1 and C5A2 of application A3 can be represented by an identifier A3, and component C5B1 of application A4 can be represented by an identifier A4. With this approach, the execution path EP1 in FIG. 14 could be expressed as: C1-C1A-C1A1-C2-C3-C3A-C4-A2-A3-C6. The remaining execution paths can be revised accordingly for consistency. This approach may be used when information regarding which components are invoked is more significant for the first application than for the remaining applications. In another possible approach, the components of application A1 are represented by an identifier A1, in which case EP1 can be expressed as: A1-A2-A3-A1. Many other variations are possible.

FIG. 16a depicts group assignments for the execution paths of FIG. 14, based on the inter-execution path distances of FIG. 15, along with application runtime data associated with each execution path and message. In this example, twenty messages, M1 through M20, invoked twelve different execution paths, EP1 through EP12. Application runtime data ARD1 through ARD20 is also depicted. A given execution path can be invoked multiple times by different messages. Further, the execution paths are assigned into groups so that execution paths having the smallest distance are assigned into the same group. For example, referring to FIG. 15, it can be seen that a distance of one separates EP1 from EP2, EP4 and EP7. Accordingly, these execution paths are assigned to group 1. A distance of one separates EP3 from EP6 and EP9. Accordingly, these execution paths are assigned to group 2. A distance of one separates EP5 from EP11. Accordingly, these execution paths are assigned to group 3. EP8 and EP10 can also be grouped in group 3 because they have a distance of 1 from EP11. Similarly, EP12 can be grouped in group 2 because it has a distance of 1 from EP6 and EP9. Again, this is one possible approach, and many other approaches are possible.

Once an execution path group is defined, it may be maintained constant. Or, an execution path group can be modified over time based on new execution paths, such as by modifying a representative execution path, and/or new execution path groups may be formed over time. These options can all be configured by the operator.

Also, a group may be provided for execution paths which include components related to errors.

FIG. 16b depicts representative execution paths and message strings for each group of FIG. 16a, along with aggregated application runtime data associated with each group. Once the execution path groups are defined, a representative execution path from each group can be selected to represent the group for calculating distance metrics relative to new execution paths. For example, the representative execution path can be one of the execution paths in the group, such as the first execution path in the group or a randomly chosen execution path in the group. In another approach, the representative execution path may be one of the execution paths in the group for which a sum of the inter-execution path distances relative to other execution path in the group is a minimum. For ties, one of the tied execution paths can be chosen randomly. Or, the representative execution path may be synthesized to correspond to an average of the execution paths in the group. In the present example, EP1, EP3 and EP5 are selected as the representative messages for groups 1, 2 and 3, respectively.

Additionally, aggregated application runtime data (ARD-AGG) is depicted for each message group. In one approach, the aggregated application runtime data represents an aggregation of application runtime data obtained when the application executes in response to the receipt of messages in the group. For example, application runtime data can represent a response time. For instance, in FIG. 16a, in group 3, ARD1, ARD5, ARD7, ARD13 and ARD19 for EP1, EP5, EP7, EP13 and EP19, respectively, may be 100 msec., 125 msec., 150 msec., 200 msec. and 250 msec. Aggregated application runtime data (ARD-AGG3) for the group can therefore include a slowest (longest) response time of 250 msec. Accordingly, once the execution paths are assigned to groups, the application runtime data which is associated with each execution path can be aggregated over the group.

Further, the grouping of messages can be correlated with grouping of execution paths since each message is associated with an execution path. Thus, messages M1 through M20 can be assigned to message groups which correspond to the execution path groups. Specifically, the execution path group identifiers in FIG. 16a can be used as the message group identifiers as well. In this case, M3, M8, M9, M11, M12, M15 and M17 are assigned to message group 1, M2, M4, M6, M10, M14, M16, M18 and M20 are assigned to message group 2, and M1, M5, M7, M13 and M19 are assigned to message group 3. Similarly, a representative message string can be selected, as discussed previously, and correlated with the aggregated application runtime data. For example, FIG. 16b indicates that M3, M2 and M1 are representative message strings for message groups 1, 2 and 3, respectively, and are correlated with aggregated application runtime data ARD-AGG1, ARD-AGG2 and ARD-AGG3, respectively. A count of the number of execution paths or message strings which have been assigned to each group is also provided.

Optionally, the grouping of the messages need not directly follow the grouping of the execution paths.

Note that the operator can review and edit the group assignments, as well as the representative execution paths.

The agent or other process associated with the application, and/or a central manager, if used, can maintain the information identified in FIGS. 14-16b.

Figure 17A:
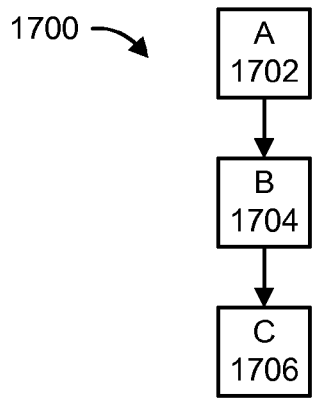
FIGS. 17*a-c* depict trees showing different execution paths.
Figure 17B:
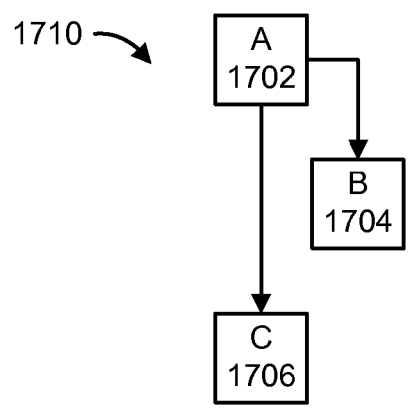
Figure 17C:
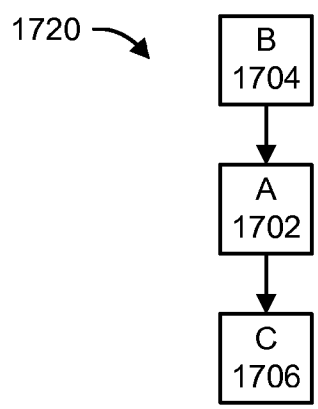

FIGS. 17a-c depict trees showing different execution paths. As mentioned, ignoring component order in the distance algorithm results in a less strict grouping criterion so that fewer unique groups result. On the other hand, comparing a tree of all participating components results in a strict grouping criterion, so that a larger number of unique groups result.

To illustrate, execution paths can be represented by trees 1700, 1710 and 1720, e.g., directed graphs, in which components which are invoked earlier than others are closer to the top of the tree, and the branches of the tree indicate associated calling and called components. For example, in the tree 1700 of FIG. 17a, a component A 1702 calls a component B 1704, then the component B 1704 calls a component C 1706. In the tree 1710 of FIG. 17b, the component A 1702 calls the component B 1704, then the component A 1702 calls the component C 1706. In the tree 1720 of FIG. 17c, the component B 1704 calls the component A 1702, then the component A 1702 calls the component C 1706.

In a least strict grouping approach, component order is ignored, and the relationship between called and called components is not considered. In this case, all three execution paths are considered to be the same since they all include one occurrence of components A, B and C.

In a grouping approach of intermediate strictness, component order is considered, but the relationship between called and called components is not considered. In this case, execution paths 1700 and 1710 and are considered to be the same since they both include an invocation of component A, followed by an invocation of B, followed by an invocation of component C. However, execution paths 1700 and 1710 are different from execution path 1720.

In a most strict grouping approach, component order is considered along with the relationship between called and called components. In this case, execution paths 1700, 1710 and 1720 all differ from one another. Execution paths 1700 and 1710 differ because component C 1706 is called by component B 1704 in execution path 1700, whereas component C 1706 is called by component A 1702 in execution path 1710.

Figure 18:
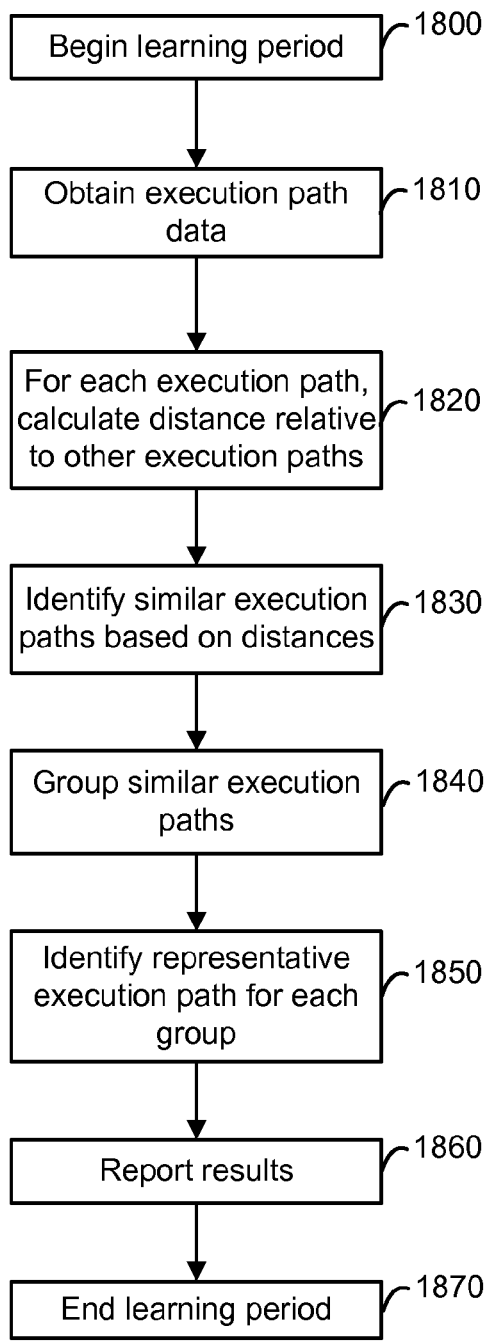
FIG. 18 depicts a learning process for defining execution path groups.

FIG. 18 depicts a learning process for defining execution path groups. In one approach, assignment of execution paths to groups occurs in a learning period in which a number of execution paths are stored and subsequently processed to determine their inter-execution path distances. The messages which are associated with the execution paths can also be stored. This may be considered an initialization process. Once the execution path groups are defined, subsequently received execution paths can be assigned to the existing groups. In particular, at step 1800, a learning period begins. At step 1810, execution paths received by the application are obtained. For example, the agent associated with the application may store the execution paths in a local data store. Compression may also be performed. At step 1820, for each execution path, a distance is calculated relative to other execution paths. At step 1830, similar execution paths are identified based on the distances. For example, execution paths whose distance is less than a threshold may be considered to be similar. The threshold may be predetermined or set based on the distance calculations. Setting the threshold based on the distance calculations may take into account the distribution of distances, including the maximum and the minimum distance. At step 1840, similar execution paths are grouped. For example, flags or other identifiers may be set for the execution paths to indicate the group into which they are assigned. At step 1850, a representative execution path is identified for each group.

At step 1860, results are reported, e.g., by providing a data file and/or displaying a user interface. The results can include the information provided in FIG. 16b, for example, including execution path/message group identifier, representative execution path, representative message string, and aggregated application runtime data organized by execution path group. In one approach, results are stored in a log and the log is periodically reported. Agents for multiple applications may report results to the central manager. At step 1870, the learning period ends.

Figure 19:
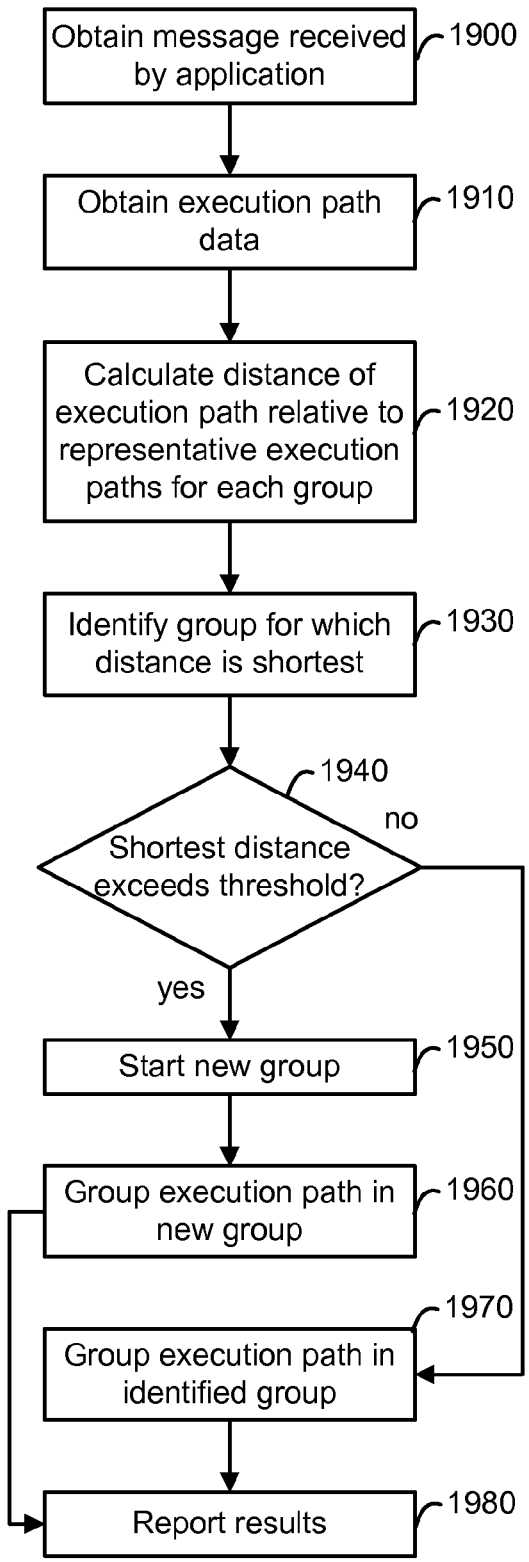
FIG. 19 depicts a process for grouping execution paths and associated messages.

FIG. 19 depicts a process for grouping execution paths and associated messages. The process can occur after the learning period depicted in FIG. 18, for example. At step 1900, a message received by the application is obtained. For example, the agent associated with the application may store the message in a local data store. At step 1910, the execution path is obtained, e.g., via instrumentation and the agent. Compression may also be performed. At step 1920, a distance is calculated for the execution path relative to a representative execution path for each group. At step 1930, the group for which the distance is the shortest is identified. At decision step 1940, which is used in one possible approach, a determination is made as to whether the shortest (minimum) distance exceeds a threshold. The threshold can be preset or set based on the distance calculations. If the shortest distance exceeds the threshold, a new execution path group is started (step 1950) and the execution path is grouped into the new group, e.g., as the sole member of the group initially (step 1960). If the shortest distance does not exceed the threshold, the execution path is grouped into the identified group for which the distance is shortest (step 1970). At step 1980, results are reported. Results can be reported after one or more new execution paths are received, e.g., by providing a data file and/or displaying a user interface. The results can include the information provided in FIG. 16*b*, for example. In one approach, results are stored in a log and the log is periodically reported.

Further, the representative execution paths need not be reported when it is only desired to correlate the representative message with the aggregated application runtime data.

Once the execution path groups are defined, it is not necessary to store each execution path which is grouped. Instead, a count can be maintained of the number of execution paths which have been grouped into an execution path group. This count can identify the number of execution paths which were used to define a group and/or the number of execution paths which have been assigned to a previously defined group. Various other counts can be maintained as well. As a result, the amount of information which is reported can be reduced relative to a case where each message string and execution path is reported.

Further, the process outlined by FIG. 19 can be modified so that multiple execution paths are processed at a time rather than one execution path being processed at a time.

Figure 20:
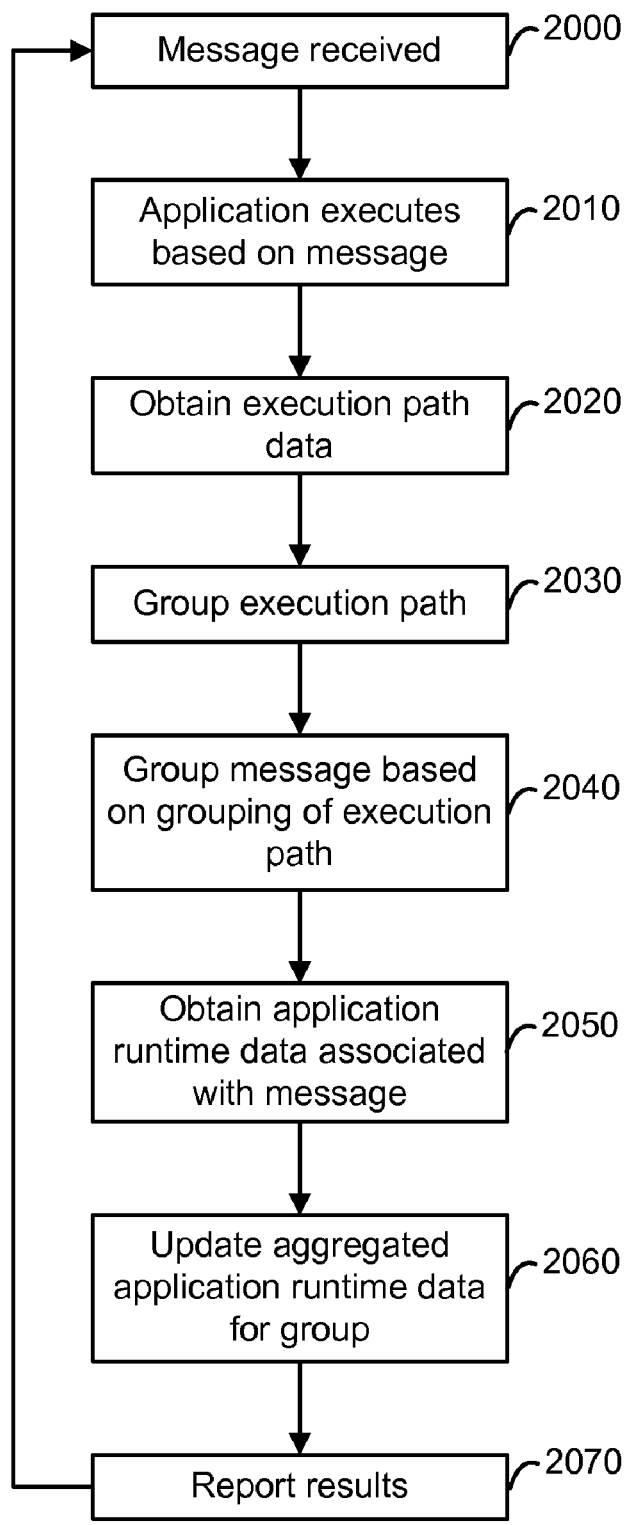
FIG. 20 depicts a process for grouping execution paths and obtaining aggregated application runtime data.

FIG. 20 depicts a process for grouping execution paths and obtaining aggregated application runtime data. At step 2000, a message is received by an application and, at step 2010, the application executes based on the message, such as to fulfill a request. At step 2020, execution path data is obtained. Compression may also be performed. At step 2030, the execution path is grouped, e.g., using the techniques discussed herein. For instance, this can include defining groups based on a number of execution paths obtained in a learning period, or assigning one or more execution paths to previously defined groups. At step 2040, the message is grouped, e.g., based on the grouping of the execution path. At step 2050, application runtime data associated with the execution path is obtained. At step 2060, the aggregated application runtime data for a group can be updated. For example, the aggregated application runtime data for a group may indicate that a slowest response time for the group is 200 msec. If the response time of a new execution path is 250 msec., the aggregated application runtime data for the group can be updated to indicate that the slowest response time for the group is now 250 msec. At step 2070, results are reported as discussed.

Figure 21:
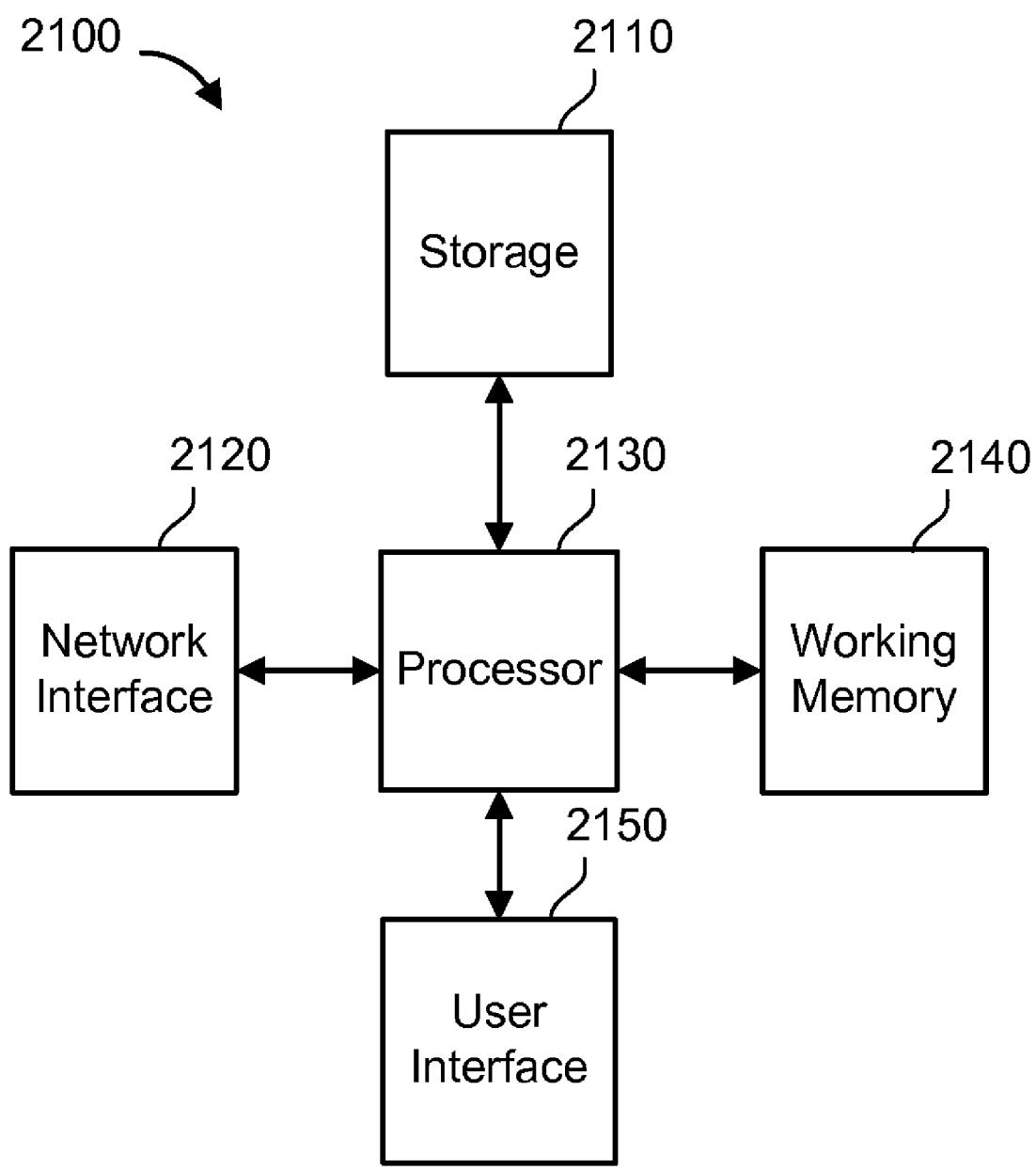
FIG. 21 depicts a computer system.

FIG. 21 depicts a computer system. The computer system 2100 is a simplified representation of a system which might be used as a web browser, application server and/or central manager, such as discussed in connection with FIGS. 1-3. The computer system 2100 includes a storage device 2110 such as a hard disk or portable media, a network interface 2120 for communicating with other computer systems, a processor 2130 for executing software instructions, a working memory 2140 such as RAM for storing the software instructions after they are loaded from the storage device 2110, for instance, and a user interface display 2150. The storage device 2110 may be considered to be a processor readable storage device having processor readable code embodied thereon for programming the processor 2130 to perform methods for providing the functionality discussed herein. The user interface display 2150 can provide information to a human operator based on the data received from one or more agents. The user interface display 2150 can use any known display scheme, whether graphical, tabular or the like.

The functionality described herein may be implemented using one or more processor readable storage devices having processor readable code embodied thereon for programming one or more processors. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Combinations of any of the above are also included within the scope of computer readable media.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. At least one non-transitory processor-readable storage device having processor-readable code embodied thereon for programming at least one processor to perform a method, the method comprising:

receiving, at a starting component of an application, a plurality of incoming messages, each incoming message is received from a respective user, and comprises a request to perform a business transaction, thereby invoking the starting component as a first component in a respective sequence of components, where each component corresponds to a respective business logic step of the business transaction;

in response to each incoming message, the starting component initiates a respective process at the application to perform the business transaction, the business transaction is performed by invoking other components of the respective sequence to carry out the business logic steps, after which a program control is returned back to the starting component, and the starting component provides a respective response message to the respective user;

storing data in at least one log which identifies respective execution paths of the application, each respective execution path identifies one of the respective sequences of components;

responsive to the storing of data in the at least one log, calculating metrics which represent distances between the execution paths, the calculating metrics includes, for the respective sequences of components of the respective execution paths, assigning higher weights to at least one of: (a) a first n components and (b) a last m components;

grouping the execution paths according to the metrics into a plurality of groups of execution paths; and responsive to the grouping of the execution paths, grouping the messages into a plurality of groups of messages.

2. The at least one non-transitory processor-readable storage device of claim 1, wherein:

the execution paths occur in at least one application server;

the incoming messages are received at the at least one application server from at least one web browser; and at least one of the incoming messages includes a URL query which invokes the starting component.

3. The at least one non-transitory processor-readable storage device of claim 1, wherein:

the metrics are calculated by considering an order in which the components are invoked in each respective execution path.

4. The at least one non-transitory processor-readable storage device of claim 1, wherein:

the metrics are calculated by considering a predetermined subset of the invoked components in each respective execution path.

5. The at least one non-transitory processor-readable storage device of claim 1, wherein:

the execution paths are grouped according to whether a subset of consecutive components in one execution path is the same as a subset of consecutive components in another execution path.

6. The at least one non-transitory processor-readable storage device of claim 5, wherein:

the subset of consecutive components in the one execution path includes a predetermined number of consecutive components at a start of the one execution path and the subset of consecutive components in the another execution path includes the predetermined number of consecutive components at a start of the another execution path.

7. The at least one non-transitory processor-readable storage device of claim 5, wherein:

the subset of consecutive components in the one execution path includes a predetermined number of consecutive components at an end of the one execution path and the subset of consecutive components in the another execution path includes the predetermined number of consecutive components at an end of the another execution path.

8. The at least one non-transitory processor-readable storage device of claim 5, wherein:

the subset of consecutive components in the one execution path includes a first predetermined number of consecutive components at a start of the one execution path and a second predetermined number of consecutive components at an end of the one execution path, and the subset of consecutive components in the another execution path includes the first predetermined number of consecutive components at a start of the another execution path and the second predetermined number of consecutive components at an end of the another execution path.

9. The at least one non-transitory processor-readable storage device of claim 1, wherein:

the execution paths are grouped so that execution paths whose distance from one another is less than a threshold are grouped together.

10. The at least one non-transitory processor-readable storage device of claim 1, wherein:

the execution paths are grouped so that each of the plurality of groups of execution paths has a similar number of execution paths.

11. The at least one non-transitory processor-readable storage device of claim 1, wherein:

the execution paths are grouped into a hierarchy of groups.

12. The at least one non-transitory processor-readable storage device of claim 1, wherein:

in each respective execution path, the calling of the at least one other component is identified by instrumentation.

13. The at least one non-transitory processor-readable storage device of claim 1, wherein:

at least one of the execution paths extends across multiple applications, and an identifier which represents invoked components in at least a first application of the multiple applications is used in the calculating of the metrics.

14. The at least one non-transitory processor-readable storage device of claim 1, wherein the method performed further comprises:

providing a representative execution path for at least one of the groups of execution paths.

15. The at least one non-transitory processor-readable storage device of claim 1, wherein the method performed further comprises:

providing a representative execution path for at least one of the groups of execution paths by determining an execution path in the at least one of the groups of execution paths for which a sum of the distances relative to other execution paths in the at least one of the groups of execution paths is a minimum.

16. The at least one non-transitory processor-readable storage device of claim 1, wherein:

each invoked component is identified in the at least one log by a class or method with which the component is associated.

17. The at least one non-transitory processor-readable storage device of claim 1, wherein:

in at least one of the respective sequences of components, the starting component invokes other components of the respective sequence by calling at least a second component, which in turn calls at least a third component, before the program control is returned back to the starting component.

18. The at least one non-transitory processor-readable storage device of claim 1, wherein:

the at least one log includes, for each execution path, an identifier of the execution path and identifiers of the components of the execution path, in an order in which the components were invoked.

19. The at least one non-transitory processor-readable storage device of claim 1, wherein the method performed further comprises:
responsive to the grouping of the messages, reporting results by displaying a user interface which identifies messages in the groups of messages.

20. The at least one non-transitory processor-readable storage device of claim 19 wherein:
the reporting identifies a count of messages grouped into each of the plurality of groups of messages.

21. At least one non-transitory processor-readable storage device having processor-readable code embodied thereon for programming at least one processor to perform a method, the method comprising:
storing data in at least one log which identifies respective execution paths of at least one application, each respective execution path is responsive to receipt by the at least one application of a respective message, where each respective message is a request to perform a business transaction, and each respective execution path includes: (a) a starting component which is invoked responsive to receipt of the respective message and (b) a second component which is called by the starting component, (c) and a third component which is called by the second component, where each component represents a business logic step of the business transaction;
responsive to the storing of data in the at least one log, calculating metrics which represent distances between the execution paths;
grouping the execution paths according to the metrics into a plurality of groups of execution paths; and
responsive to the grouping of the execution paths, grouping the messages into a plurality of groups of messages;
wherein at least one of the execution paths extends over multiple applications, the distances are obtained separately for the components of each application, and the calculating metrics accords higher weights to distance metrics of a specified one of the multiple applications.

22. The at least one non-transitory processor-readable storage device of claim 21, wherein:
the metrics are calculated by assigning different weights to different components in each respective execution path, where the different weights are assigned by an operator.

23. The at least one non-transitory processor-readable storage device of claim 21, wherein:
the metrics are calculated by considering an order in which the components are invoked in each respective execution path.

24. The at least one non-transitory processor-readable storage device of claim 21, wherein:
the metrics are calculated by considering a predetermined subset of the invoked components in each respective execution path.

25. The at least one non-transitory processor-readable storage device of claim 21, wherein:
the execution paths are grouped so that execution paths whose distance from one another is less than a threshold are grouped together.

26. The at least one non-transitory processor-readable storage device of claim 21, wherein:
the execution paths are grouped so that each of the plurality of groups of execution paths has a similar number of execution paths.

27. The at least one non-transitory processor-readable storage device of claim 21, wherein:
the execution paths are grouped into a hierarchy of groups.

28. The at least one non-transitory processor-readable storage device of claim 21, wherein the method performed further comprises:
providing a representative execution path for at least one of the groups of execution paths.

29. The at least one non-transitory processor-readable storage device of claim 21, wherein the method performed further comprises:
providing a representative execution path for at least one of the groups of execution paths by determining an execution path in the at least one of the groups of execution paths for which a sum of the distances relative to other execution paths in the at least one of the groups of execution paths is a minimum.

30. The at least one non-transitory processor-readable storage device of claim 21, wherein:
the execution paths are grouped according to whether a subset of consecutive components in one execution path is the same as a subset of consecutive components in another execution path.

31. The at least one non-transitory processor-readable storage device of claim 30, wherein:
the subset of consecutive components in the one execution path includes a predetermined number of consecutive components at a start of the one execution path and the subset of consecutive components in the another execution path includes the predetermined number of consecutive components at a start of the another execution path.

32. The at least one non-transitory processor-readable storage device of claim 30, wherein:
the subset of consecutive components in the one execution path includes a predetermined number of consecutive components at an end of the one execution path and the subset of consecutive components in the another execution path includes the predetermined number of consecutive components at an end of the another execution path.

33. The at least one non-transitory processor-readable storage device of claim 30, wherein:
the subset of consecutive components in the one execution path includes a first predetermined number of consecutive components at a start of the one execution path and a second predetermined number of consecutive components at an end of the one execution path, and the subset of consecutive components in the another execution path includes the first predetermined number of consecutive components at a start of the another execution path and the second predetermined number of consecutive components at an end of the another execution path.

34. At least one non-transitory processor-readable storage device having processor-readable code embodied thereon for programming at least one processor to perform a method, the method comprising:
receiving, at a starting component of an application, a plurality of incoming messages, each incoming message is received from a respective user, and comprises a request to perform a business transaction, thereby invoking the starting component as a first component in a respective sequence of components, where each component corresponds to a respective business logic step of the business transaction;
in response to each incoming message, the starting component initiates a respective process at the application to perform the business transaction, the business transaction is performed by invoking other components of the respective sequence to carry out the business logic steps, after which a program control is returned back to the starting component, and the starting component provides a respective response message to the respective user;

storing data in at least one log which identifies respective execution paths of the application, each respective execution path identifies one of the respective sequences of components;

responsive to the storing of data in the at least one log, calculating metrics which represent distances between the execution paths;

grouping the execution paths according to the metrics into a plurality of groups of execution paths; and responsive to the grouping of the execution paths, grouping the messages into a plurality of groups of messages;

wherein at least one of the execution paths extends over multiple applications, the distances are obtained separately for the components of each application, and the calculating metrics accords higher weights to distance metrics of a specified one of the multiple applications.

35. The at least one non-transitory processor-readable storage device of claim 34, wherein the method performed further comprises:

responsive to the grouping of the messages, reporting results by displaying a user interface which identifies messages in the groups of messages.

36. At least one non-transitory processor-readable storage device having processor-readable code embodied thereon for programming at least one processor to perform a method, the method comprising:

storing data in at least one log which identifies respective execution paths of at least one application, each respective execution path is responsive to receipt by the at least one application of a respective message, where each respective message is a request to perform a business transaction, and each respective execution path includes: (a) a starting component which is invoked responsive to receipt of the respective message and (b) a second component which is called by the starting component, (c) and a third component which is called by the second component, where each component represents a business logic step of the business transaction;

responsive to the storing of data in the at least one log, calculating metrics which represent distances between the execution paths, the calculating metrics includes, for the execution paths, assigning higher weights to at least one of: (a) a first n components and (b) a last m components;

grouping the execution paths according to the metrics into a plurality of groups of execution paths; and responsive to the grouping of the execution paths, grouping the messages into a plurality of groups of messages.

37. The at least one non-transitory processor-readable storage device of claim 36, wherein the method performed further comprises:

responsive to the grouping of the messages, reporting results by displaying a user interface which identifies messages in the groups of messages.

* * * * *